US012641684B2

(12) United States Patent
Mandl et al.

(10) Patent No.: US 12,641,684 B2
(45) Date of Patent: May 26, 2026

(54) HEATING DEVICE

(71) Applicant: E.G.O. Elektro-Geraetebau GmbH, Oberderdingen (DE)

(72) Inventors: Matthias Mandl, Bretten (DE); Michael Tafferner, Malsch (DE); Thomas Hauk, Bretten (DE); Manuel Schmieder, Oberderdingen (DE); Holger Koebrich, Kraichtal-Gochsheim (DE); Roland Muehlnikel, Bretten (DE); Alfred Suss, Bretten (DE); Sebastian Eigl, Bretten (DE); Henry Zipplies, Eppingen (DE); Volker Block, Bretten (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 959 days.

(21) Appl. No.: 17/819,113

(22) Filed: Aug. 11, 2022

(65) Prior Publication Data

US 2022/0386420 A1 Dec. 1, 2022

Related U.S. Application Data

(63) Continuation of application No. PCT/EP2021/051822, filed on Jan. 27, 2021.

(30) Foreign Application Priority Data

Feb. 26, 2020 (WO) ................. PCT/EP2020/055041

(51) Int. Cl.
*H05B 3/16* (2006.01)

(52) U.S. Cl.
CPC ......... *H05B 3/16* (2013.01); *H05B 2203/013* (2013.01); *H05B 2203/016* (2013.01)

(58) Field of Classification Search
CPC ................ H05B 3/16; H05B 2203/013; H05B 2203/016; H05B 3/34; H05B 2203/007; H05B 3/20; H05B 3/06; H05B 3/10
See application file for complete search history.

(56) References Cited

U.S. PATENT DOCUMENTS 6,049,063 A * 4/2000 Barber .................... F24D 13/02 219/549
6,150,642 A 11/2000 Weiss et al.
(Continued)

FOREIGN PATENT DOCUMENTS

DE 9200124 U1 5/1992
DE 19831574 A1 1/2000
(Continued)

OTHER PUBLICATIONS

JP2010186566A Translation (Year: 2025).*
(Continued)

*Primary Examiner* — Elizabeth M Kerr
*Assistant Examiner* — Keith Brian Assante
(74) *Attorney, Agent, or Firm* — ALSTON & BIRD LLP

(57) ABSTRACT

The invention relates to a heating device having a flat expanded support and at least one heating conductor assembly thereon which is electrically connected by means of two connection contacts. The heating conductor assembly has a plurality of heating conductors which are connected together at connection points and are wired as a whole so as to form parallel and series circuits between the connection contacts. The plurality of heating conductors are advantageously designed as a lattice, wherein every set of four heating conductors forms a closed mesh, and four heating conductors are connected together at the connection points. The
(Continued)

heating conductor assembly is applied onto the support with a film construction in a film method, advantageously a thick-film method.

23 Claims, 12 Drawing Sheets

(56) References Cited

U.S. PATENT DOCUMENTS

| | | | | |
|---|---|---|---|---|
| 6,294,770 | B1 * | 9/2001 | Hasegawa ................ | D04C 1/06 219/544 |
| 7,211,772 | B2 | 5/2007 | Carpino, II et al. | |
| 9,107,203 | B2 | 8/2015 | Spagnolini et al. | |
| 10,442,273 | B2 | 10/2019 | Wittkowski et al. | |
| 11,032,877 | B2 | 6/2021 | Abendschoen | |
| 2006/0043240 | A1 | 3/2006 | Hindel et al. | |
| 2006/0201933 | A1 | 9/2006 | Carpino, II et al. | |
| 2007/0278214 | A1 * | 12/2007 | Weiss ..................... | H05B 3/342 219/545 |
| 2011/0089160 | A1 | 4/2011 | Kuriki | |
| 2013/0068755 | A1 * | 3/2013 | Frutschy ........... | H01M 10/6571 219/542 |
| 2013/0075383 | A1 * | 3/2013 | Kim ......................... | H05B 3/12 219/203 |
| 2013/0277360 | A1 * | 10/2013 | Noro ........................ | B01J 35/57 219/553 |
| 2015/0096969 | A1 * | 4/2015 | Uprety .................... | C03C 17/42 219/203 |
| 2017/0086257 | A1 | 3/2017 | Muehlnikel et al. | |
| 2017/0129310 | A1 | 5/2017 | Sagou et al. | |
| 2018/0027614 | A1 * | 1/2018 | De Luca .............. | H05B 6/6408 219/528 |
| 2018/0152990 | A1 * | 5/2018 | Klinkmüller .......... | H05B 3/265 |
| 2018/0176994 | A1 * | 6/2018 | Wittenhagen ......... | F24C 15/102 |
| 2021/0070019 | A1 * | 3/2021 | Mannheim Astete ....................... | B32B 17/1011 |
| 2021/0084720 | A1 | 3/2021 | Gima et al. | |
| 2021/0195693 | A1 * | 6/2021 | Ito .......................... | H05B 3/267 |
| 2022/0053612 | A1 * | 2/2022 | De Luca ................. | F24C 7/043 |

FOREIGN PATENT DOCUMENTS

| | | | | |
|---|---|---|---|---|
| DE | 20111067 | U1 | | 9/2001 |
| DE | 10112405 | A1 | | 10/2001 |
| DE | 20114622 | U1 | | 1/2003 |
| DE | 102016225462 | A1 | | 6/2018 |
| EP | 1809073 | A1 | | 7/2007 |
| EP | 3145271 | A1 | | 3/2017 |
| EP | 3145273 | A1 | | 3/2017 |
| JP | H 05-013206 | A | | 1/1993 |
| JP | H05-093903 | A | | 4/1993 |
| JP | 2001-313154 | A | | 11/2001 |
| JP | 2002-083669 | A | | 3/2002 |
| JP | 2010-003667 | A | | 1/2010 |
| JP | 2010186566 | A | * | 8/2010 |
| JP | 2016-011099 | A | | 1/2016 |
| JP | 2016-022857 | A | | 2/2016 |
| JP | 2016-143511 | A | | 8/2016 |
| JP | 2017-020318 | A | | 1/2017 |
| JP | 2017-208190 | A | | 11/2017 |
| JP | 2018-055941 | A | | 4/2018 |
| KR | 10-2019-0026616 | A | | 3/2019 |
| WO | 2005/020635 | A1 | | 3/2005 |
| WO | WO 2014/202768 | A1 | | 12/2014 |
| WO | 2019/131928 | A1 | | 7/2019 |
| WO | 2019/230733 | A1 | | 9/2021 |

OTHER PUBLICATIONS

English Translation of JP Office Action dated Jan. 28, 2025 for JP Application No. 2022551332, 9 page(s).

JP Office Action Mailed on Jan. 28, 2025 for JP Application No. 2022551332, 8 page(s).

International Searching Authority, International Search Report (ISR) and Written Opinion received for International Application No. PCT/EP2021/051822, dated Apr. 30, 2021, 14 pages, European Patent Office, Netherlands.

International Searching Authority, International Search Report (ISR) and Written Opinion received for International Application No. PCT/EP2020/055041, dated Oct. 30, 2020, 12 pages, European Patent Office, Netherlands.

English Translation of KR Office Action dated Mar. 26, 2025 for KR Application No. 10-2022-7028850, 8 page(s).

KR Office Action Mailed on Mar. 26, 2025 for KR Application No. 10-2022-7028850, 10 page(s).

CN Office Action, including Search Report Mailed on May 16, 2025 for CN Application No. 202180017294, 15 page(s).

English Translation of CN Office Action, including Search Report dated May 16, 2025 for CN Application No. 202180017294, 15 page(s).

English translation of EP Office Action Mailed on Oct. 17, 2025 for EP Application No. 21702902.4, 5 page(s).

EP Office Action Mailed on Oct. 17, 2025 for EP Application No. 21702902.4, 6 page(s).

English translation of JP Decision to Grant dated Sep. 2, 2025 for JP Application No. 2022551332, 3 page(s).

JP Decision to Grant Mailed on Sep. 2, 2025 for JP Application No. 2022551332, 3 page(s).

* cited by examiner

HEATING DEVICE

CROSS-REFERENCE TO RELATED APPLICATIONS

This application is a continuation of PCT/EP2021/051822, filed Jan. 27, 2021, which claims priority to PCT/EP2020/055041, filed Feb. 26, 2020, the contents of which are hereby incorporated herein in their entirety by reference.

FIELD OF APPLICATION AND PRIOR ART

The invention relates to a heating device having a carrier, connection contacts and at least one heating conductor assembly on the carrier with a plurality of heating conductors.

EP 3145273 A1 discloses a heating device with a carrier, on the outside of which heating conductors are attached. The carrier can be planar or tubular in shape. The heating conductors then run in a meandering pattern or in loops with parallel tracks. The individual tracks which act as heating conductors are series-connected, i.e., arranged in series, and connected to the connection contacts. The configuration options are limited by a pure series connection of the heating conductors. Between 65% and 80% of the surface area of the carrier is covered with the heating conductors, which enables a very high surface density of the heat output.

DE 102016225462 A1 discloses a heating device in which a lattice or network of heating conductors runs freely between connection contacts that hold the heating conductor assembly. As a result, heat dissipation, in particular into the ambient air, is very possible. The disadvantage of this is that using a carrier, for example in the form of a container wall or a pipe wall, in order to heat the water located therein, can provide poor or inefficient heating.

OBJECT AND SOLUTION

The object of the invention is to provide a heating device as mentioned at the outset, with which the problems of the prior art can be solved and, in particular, which makes it possible to design a heating device having a large-area carrier and at least one heating conductor assembly thereon in a simple and at the same time essentially variable manner, as well as to influence a area output both with regard to the most homogeneous area output possible on the one hand and regions of higher or lower area output on the other hand.

This object is achieved by a heating device having the features of claim 1. Advantageous and preferred embodiments of the invention are the subject of the additional claims and are explained in more detail below. The wording of the claims forms part of the content of the description by explicit reference.

It is provided that the heating device has a large-area expanded carrier. On the one hand, this can be flat and level, on the other hand, it can be curved or designed as a channel, trough or tube. The heating device has at least two connection contacts and at least one heating conductor assembly, each of which is arranged on the carrier. The heating conductor assembly is connected to the at least two connection contacts for electrical connection. The entire heating device can also have more than two connection contacts, for example for divided or distributed subgroups of heating conductors. As a result, a varied heating can be achieved in a heating device either in terms of surface area or in terms of output.

The at least one heating conductor assembly has a plurality of heating conductors, for example more than fifty heating conductors or several hundred heating conductors. These heating conductors are connected to each other at connection points so that they meet one another at said connection points. They are electrically conductively connected to the connection points and are thus also electrically conductively connected to each other. The heating conductors are electrically connected as a whole so as to form parallel and series circuits between the connection contacts. Advantageously, the heating conductors form a network, with the connection points acting as nodes, in particular branching out many times and being brought together again, so that a precise subdivision or distinction between parallel connection and series connection is not possible. The heating conductor assembly has a plurality of meshes, which are formed by at least three heating conductors, so that the meshes, or at least the majority of them, are closed. At least three heating conductors are connected to each other or meet at the connection points that are comprised by this mesh. The heating conductor assembly is advantageously applied onto the carrier with a film construction in a film method. A thick-film method is suitable for this, alternatively a thin-film method, plasma spraying, or CVD and PVD methods. The heating conductors of the entire heating conductor assembly are preferably produced together, i.e., together in one step or together in several steps as part of the film construction.

The design of the heating conductor assembly with the plurality of individual heating conductors, which are connected to each other in a type of network or lattice so that current flows through them all, enables the individual heating conductors to be arranged in a well distributed manner over the area. Less than 60%, advantageously less than 50% or even less than 40% of the surface of the carrier in the region of the heating device can be directly covered, but at the same time the surface of the carrier in this region can be approximately evenly covered with the heating conductors. This makes it possible to heat the carrier in a very uniform manner or with a homogeneous area output over the surface area, but overall with a lower output than in the prior art. The area output is therefore advantageously related to the surface area of a heating conductor assembly or to the surface area that is continuously covered by heating conductors or heating conductor assemblies.

In an embodiment of the invention, one direction of the heating conductors can have an angle with a longitudinal extent of the connection contacts, wherein this angle is in a range between 2° and 85°. Thus, the heating conductors run neither parallel nor at right angles to one of the connection contacts, but at an angle in between or at an angle thereto. The angle can advantageously be between 35° and 60°, particularly advantageously it can be about 45°. This allows a uniform structure of the heating conductor assembly to be achieved.

It is advantageously provided that the heating conductors each run in a straight manner, in particular all heating conductors of the heating conductor assembly run in a straight manner. In this way, problems with current concentrations or the like, as can occur with curved heating conductors, are prevented from arising in the first place. It can be provided that there are only exactly two or exactly three directions for the heating conductors to run, and each of the heating conductors then runs along one of these directions.

In one embodiment of the invention, at least 80% of the connection points, and particularly advantageously at least 95% of the connection points, can have the same number of heating conductors connected to them. This means that there may be some exceptions, in particular at an edge region of the heating conductor assembly or the quantity of heating conductors on the carrier, in that here fewer or more heating conductors are provided or meet at a connection point. In the edge regions of the heating conductor assembly, this will be difficult to avoid; here, as a rule, fewer heating conductors will be provided at a connection point. Since in this case, the heating conductors that would run into the free region next to the edge region are not longer present.

In a further embodiment of the invention, it can be provided that exactly three heating conductors or exactly four heating conductors meet at 95% or the majority of the connection points. A more homogeneous configuration of the heating conductor assembly is also possible in this way. If three heating conductors meet at a connection point, the associated meshes can be hexagonal in shape or advantageously in the shape of a triangle, in particular a regular triangle. If four heating conductors meet at a connection point, the associated meshes can advantageously be rectangular or square.

Alternatively, the meshes can be approximately hexagonal or in the form of a honeycomb, preferably exactly hexagonal. In this case, four longitudinal sides of the hexagon can each be formed by a single heating conductor, while two opposite longitudinal sides of the hexagon are each formed by an elongate connection point. This connection point is then a type of elongated connection region, wherein the heating conductors are preferably longer than the elongate connection points, in particular 50% to 300% longer.

In an advantageous development of the invention, most heating conductors run in a straight manner, in particular at least 80% or even at least 95%. A straight design of most or all of the heating conductors avoids the problems described above regarding inhomogeneous current conduction along curved tracks, which lead either to an undesirably inhomogeneous heat output distribution or to damage to the heating conductor and/or the carrier.

In an alternative development of the invention, most heating conductors are curved, in particular at least 80% of the heating conductors are curved. Advantageously, the heating conductors are curved twice in opposite directions, in particular in an S-shape. The two arcs running in opposite directions are particularly advantageously evenly curved. Such a design can be point-symmetrical to a point halfway along the heating conductor. As a result, the length of a curved heating conductor, in particular curved one, two or more times, between the connection points at its ends with the other heating conductors is at least 5% greater than the direct straight extension between these connection points. A length can preferably be even greater, in particular at least 10% greater, for example at least 20% greater.

A curved heating conductor makes it possible, on the one hand, to achieve a higher resistance value for a heating conductor material with an advantageous thickness and width of the conductors due to the increased length for a given resistance. On the other hand, a better distribution of the extension of the heating conductors and thus also of their generated heat output or heating can take place over the entire surface area covered by the heating conductor assembly. The heating conductors can always run in a curved manner or never run in a straight manner in any section. Alternatively, they could run in a straight manner in one section, for example a middle section, where a change in curvature takes place.

In an advantageous development of the invention, a plurality of the heating conductors has the same length, in particular at least 80% of the heating conductors. Advantageously, at least 95% of the heating conductors have the same length, so that actually only a few heating conductors differ in length, for example because they are arranged at the edge region of the heating conductor or adjacent to free surface areas, as explained in detail below as an option.

It can be preferably provided for a large part of the heating conductors to have the same shape. This can be at least 80% of the heating conductors, particularly advantageously at least 95% of the heating conductors. These are therefore identical in terms of length, width, longitudinal extension and thickness. If a homogeneous power supply is then ensured by appropriate construction of the heating conductor assembly, there is also a homogeneous heat output.

In one embodiment of the invention, an angular region between two adjacent heating conductors, which meet or are connected to each other at a connection point, is not angular or pointed, but rather rounded. A rounding in this angular region can be such that it is rounded with a radius of at least 2% of the maximum width of one of the heating conductors. In particular, this radius can be 5% to 100% or even 200% of the maximum width of a heating conductor, preferably 20% to 50%. This means there are no discontinuous inhomogeneities in the current distribution in this angular region. Due to the rounding, the conductor cross-section is slightly increased due to the greater width, which leads to a reduction in the heat output. However, this can be limited by designing the radius so that it does not have an interfering effect. Under certain circumstances, such a rounding can also simplify the production of the heating conductor assembly, for example by means of screen printing.

It can be provided that at least 80% or at least 95% of the connection points are rounded off in the angular region, preferably in all angular regions at the connection points. A rounding can in particular also be designed identically, so that the same design and the same behavior during heating operation are ensured in each case.

In a first embodiment of the invention, it is possible for a connection point to be formed by heating conductors each having the same width intersecting one another, in particular two heating conductors, wherein it is possible for each of these heating conductors to have the same width. The area that is covered, so to speak, by the longitudinal extension of the two heating conductors then forms the connection point. A connection point can also be created in a similar form if not four, but only three heating conductors are connected to each other to it. These do then not have to extend beyond the connection point.

In a second embodiment of the invention, a connection point may be an area larger than a mere crossover region corresponding to the first embodiment of the invention as previously described. This can ensure that the same current density prevails in the region of the connection point as in the heating conductors themselves, so that the generation of heat output at the connection point is the same or at least not greater than in the heating conductors themselves. This can possibly also be achieved by increasing the film thickness rather than the area of a connection point.

In a further embodiment of the invention, it is possible for the heating conductors to have different widths, preferably with a maximum variation in width of 40%. A variation in the width of the heating conductors should advantageously be a maximum of 25%. If the heating conductors all have the same film thickness, heat output can be generated in a varied manner locally or in certain areas. If the heating conductors are of the same length, the narrower heating conductors generate more heat output than the wider heating conductors. In this way, the heat output or heating can be varied locally or in certain areas by means of the heating device.

Provision can advantageously be made for a heating conductor to have a constant width over an extension between the two connection points at its ends or over its length. Thus, at least at this heating conductor, the output generation is the same, distributed over its length.

Alternatively, it can be provided that a heating conductor has a width that varies over its length or over an extension between the two connection points at its ends. A variation should be in the aforementioned range of a maximum of 40% or even a maximum of 25%. Otherwise it could be that the difference in the generation of the heat output becomes too great with risk of damage to the heating conductor or the heating device due to excessively high temperatures with an uneven temperature distribution.

The width of the heating conductor can preferably increase monotonically from one connection point to the other connection point, or alternatively it can decrease monotonically. The width particularly preferably increases or decreases in a strictly monotonic manner.

In a development of the invention, it can be provided that a film thickness of the heating conductor assembly or the heating conductor itself varies by a maximum of 20% or 10%, i.e., so that it is not too different. Advantageously, it only varies by a maximum of 2% or is the same everywhere and is produced at least by the production process with the same nominal thickness. The heating conductor assembly can then be produced by a film construction, for example by means of a thick-film method, in that all material for the heating conductors is always applied simultaneously in one step or in several steps with the same amount or with the same film thickness. This enables a simple and practical production process.

In a further embodiment of the invention, it can be provided that a plurality of said connection points has only two heating conductors in at least one region of the heating conductor assembly or, so to speak, only two heating conductors meet there. These heating conductors then preferably do not extend in a straight line, but rather have an angle in relation to one another, for example in the aforementioned range of 35° to 60°. In principle, however, these heating conductors advantageously correspond to the other heating conductors in terms of width and/or length, or advantageously also in thickness. These connection points with only two heating conductors are particularly advantageously located in an edge region of the heating conductor assembly or adjacent to a free surface area within the heating conductor assembly. In this way it can be achieved that on the one hand the assembly of the heating conductors is the same as elsewhere or in the majority of the area of the heating conductor assembly, in particular formed in a regular manner. A said free surface area of the heating conductor assembly can be surrounded by heating conductors, so to speak, and can be used, for example, to provide electrical connections or sensors, for example temperature sensors, through an unheated area, i.e., where no heating conductors are provided. Advantageously, these should not be heated too much or be exposed to the heating effect of the heating conductors too much. A said edge region can cleverly also be present towards such a free surface area. While a free surface area can generally vary in size, advantageously it has an area between four and a hundred times, particularly advantageously between ten and forty times, the area of a mesh. A free surface area is advantageously delimited or completely bordered by heating conductors or by the heating conductor assembly.

In a further embodiment of the invention, it is possible for a recess to be provided in an edge region of the heating conductor assembly, that is on the side, so to speak. Such a recess can be designed in the manner of an indentation, wherein two or three heating conductors are connected to each other in the region of this indentation at the adjacent or external connection points. Here, exactly one heating conductor or exactly two heating conductors are advantageously connected to each other less than at the majority of the connection points of the rest of the heating conductor assembly. Thus, so to speak, those heating conductors that would otherwise run into or protrude into the area of said indentation are absent.

A specified free surface area within the heating conductor assembly is preferably designed in such a way that it is free of heating conductors and also of connection points. In this case, the free surface area should be bordered by heating conductors, in particular corresponding to the other regular assembly of heating conductors in the majority of the area of the heating conductor assembly. Depending on the design of the meshes or the assembly of the heating conductors meeting at the connection points, it can be provided that the free surface area is bordered by heating conductors in a straight extension or direction to one another. It is also possible for two or three heating conductors, preferably three, to be connected to each other at a plurality of connection points adjacent to the free surface area.

In an advantageous embodiment of the invention, it can be provided that a surface heat output varies by a maximum of 25% within the surface of the heating conductor assembly, in particular only where the heating conductors run, i.e., without the aforementioned free surface areas. In particular, the surface heat output can only vary by a maximum of 10%. A heat output generation that is as homogeneous as possible using the heating device can be advantageous. Alternatively, a variation of the surface heat output can also be used within a heating conductor assembly to provide higher heat outputs in specific areas. Especially due to an aforementioned variation in the width of the heating conductors, this is also easily possible within a single heating conductor assembly, particularly also with a continuous change in the surface heat output. As a result, changes in the heat output that are too varied, which could possibly lead to damage, can be avoided.

In a further embodiment of the invention, secondary connection contacts can be provided which are connected to each of the connection contacts. Such secondary connection contacts can lie opposite one another in pairs in a direction perpendicular to a longitudinal extension of the connection contacts. These can run parallel, so to speak, to the connection contacts if provided in a straight manner, which they are advantageously. Each secondary connection contact is connected to a connection contact directly or via another secondary connection contact. They can be electrically connected to each other and to the connection contact by means of bridge contacts. The secondary connection contacts are advantageously made of the same material as the connection contacts, particularly advantageously also with the same width and thickness. Thus they can be produced together for example. The bridge contacts should then be designed somewhat differently or from a different material, so that it is possible to easily cut through them by means of lasers or mechanical scribing. In this way, the heating conductor assembly can be electrically adjusted after manufacture in order to meet an exact value. Certain areas of the heating conductor assembly, i.e., some heating conductors, can thus possibly be completely or at least partially separated from an electrical power supply. This depends on whether the heating conductors connected to the secondary connection contacts are electrically contacted only by these or whether they are also connected to the other heating conductors.

Large-area contacts can be applied to a heating conductor assembly, which are designed in the form of strips and which can cover at least part of a width of a heating conductor assembly in a direction transverse to its longitudinal extent and can make electrical contact. These large-area contacts advantageously consist of material with good electrical conductivity, for example similar to the material of the aforementioned connection contacts. The large-area contacts can then be partially covered with electrically highly conductive material for electrical adjustment to a desired value of the electrical resistance, with this material then overlapping and contacting an adjacent connection contact, a secondary connection contact or an adjacent heating conductor assembly.

This results in a type of short circuit and thus in the heating conductor assembly being shortened, which results in a lower electrical resistance. Advantageously, at least two such large-area contacts can be applied next to one another at a small distance for adjustment to different values for the resistance.

The width of such a large-area contact can increase in the direction of the adjacent connection contact, the secondary connection contact or the adjacent heating conductor assembly, in particular at an end pointing in this direction. The large-area contact can become at least 50% wider. In this way, it can be covered more easily and better by the electrically highly conductive material for contacting purposes, but it does not have to be as wide over its entire length. This saves material and only minimally restricts the heating function of the heating conductors covered by it. Nevertheless, the large-area contact can be reached easily and thus contacted. In general, a large-area contact can have a varying width along its length. In particular, it can be wider from one narrow free end to the other free end, regardless of what it is adjacent to. A shape of a large-area contact can be a long narrow triangle.

In an advantageous embodiment of the invention, the heating device can have at least one additional heating conductor assembly, which has two additional connection contacts and a single large-area additional heating conductor running between them. This large-area additional heating conductor is advantageously provided with a closed surface, i.e., uninterrupted. The surface of the additional heating conductor is preferably rectangular. Provision can be made for the additional heating conductor to be elongated between the two additional connection contacts, and it can run perpendicularly to these additional connection contacts. It should therefore be longer than it is wide in the direction of the current flow. It is advantageously at least ten times longer than it is wide, particularly advantageously at least twenty times longer. This can also apply to the heating conductor assembly with the meshes of the heating conductors, so that they are each in the form of strips.

A width of the additional heating conductor can be less than a width of the heating conductor assembly with the distributed heating conductors. Its width can preferably be less than 50% of the width of the heating conductor assembly, so that its outer extent is considerably narrower. The area covered by the heating conductor material can be of a similar size, but it is also advantageously smaller.

A length of the additional heating conductor can be between 90% and 150% of the length of the heating conductor assembly. They are particularly advantageously of a similar length, so that the additional heating conductor can have a length between 100% and 120% of the length of the heating conductor assembly.

Overall, it is possible for the heating device to have at least one or two heating conductor assemblies according to the invention and at least two additional heating conductors as described above. The area output is different in each case; in particular, the heating conductor assemblies according to the invention can have a varied area heat output. This is advantageously not possible with the additional heating conductors due to their continuous, large-area design. In each case one or two heating conductor assemblies and two additional heating conductors can run parallel to one another, with the additional heating conductors having the heating conductor assemblies according to the invention between them. However, a plurality of additional heating conductors can also be provided in parallel with a single heating conductor assembly according to the invention, with the additional heating conductors advantageously having the heating conductor assembly between them.

In an embodiment of the invention, an insulating layer and/or a dielectric layer can be provided under the heating conductor or between the heating conductor and the carrier. This layer is at least as wide as the heating conductor and at most 10 mm wider than the heating conductor on both sides of the heating conductor, so that it protrudes a maximum of 10 mm on both sides under the heating conductor, in particular a maximum of 5 mm or only 2 mm, advantageously at least 0.1 mm. The extension of the insulating layer or the dielectric layer can correspond to the extension of the heating conductor or the heating conductor assembly, at least in the largest region of the heating conductor assembly. Within the meshes, the insulating layer or the dielectric layer can have free spaces in which no insulating layer or dielectric layer is provided or present. The metal surface of the carrier is exposed here.

In a further embodiment of the invention, a cover layer can be provided over or on the heating conductor, which is at least as wide as the heating conductor and is at most 10 mm wider than the heating conductor on both sides of the heating conductor, so that it surpasses the heating conductor on both sides by at most 10 mm, in particular a maximum of 5 mm or only 2 mm. Advantageously, it projects beyond the heating conductor by at least 0.1 mm on both sides. In this case, the width of the cover layer can be narrower overall than the insulating layer or the dielectric layer and thus not overlap directly onto the surface of the carrier. The extension of the cover layer particularly advantageously corresponds to the extension of the heating conductor or the heating conductor assembly, at least in the largest region of the heating conductor assembly. The cover layer can also have free spaces within these meshes, in which no insulating layer or dielectric layer is provided or present. Here again the metal surface of the carrier is exposed.

While full-area insulation is usually applied onto the carrier and full-area cover layers to the heating conductor structures for heating elements in thick-film technology in order to ensure functional basic insulation and a practical covering, the invention can save material per se, on the one hand. On the other hand, due to the smaller amount of materials used for the insulation and cover layers and their behavior during cooling, in particular due to different coefficients of thermal expansion, the deformation of the substrates used is reduced, regardless of their shape. This is supported by the lattice shape in addition to the lower use of material. Layers with a smaller surface area simply apply fewer deformation forces to the substrate.

Leakage currents with this structure, especially the insulating layer or dielectric layer, are also lower. The printed area with a lattice structure or network structure or network shape is smaller compared to an entire surface area.

In a further development, at least one of the connection contacts can be designed as a lattice structure, preferably all connection contacts which are connected to the heating conductor assembly or heating conductors. The lattice structure of the at least one connection contact has meshes with free spaces within them. In this way, the required amount of contact material can be reduced.

In one embodiment of the invention, it can be provided that the heating conductor assembly or its heating conductors are severed along free cut sections, with individual free cut sections that are connected and together form a free cut preferably beginning at an outer edge region of the heating conductor assembly. They can cut off a closed surface of the heating conductor assembly in such a way, and thereby severing the individual heating conductors, that the closed surface is electrically separated from the rest of the heating conductor assembly and is electrically insulated. It can be provided that the free-standing sections cut through a heating conductor at an angle of between 45° and 90°, preferably greater than 55°.

In a further embodiment of the invention, additional linear tracks of heating conductor material can be provided transversely to a general direction of current flow through a lattice-shaped heating conductor assembly between two connection contacts, advantageously running parallel to the connection contacts. These linear heating conductor tracks made of heating conductor material can advantageously run through connection points of the heating conductors or the meshes. They are intended to increase safety when operating the heating device if local overheating occurs due to warm regions or so-called hot spots, which may lead to one or more heating conductors burning out or being destroyed. Increased current concentrations of a current flow between the two connection contacts then occur along these linear heating conductor tracks, starting from local overheating with burning through or destruction of a heating conductor in a punctiform area. These current concentrations then lead to the heating conductors burning through, and this burning through or destruction can then continue along the linear heating conductor tracks to one side or advantageously to both sides, namely approximately parallel to the connection contacts, until the entire heating conductor assembly between the two connection contacts is severed. Then there is no longer any current flow between the connection contacts or through the heating conductor assembly. Although this is irreversibly damaged or destroyed, at the same time it is ensured that operation with a faulty heating conductor assembly is no longer possible. The heating device then has to be replaced or repaired, but the security against faulty operation is very high.

These and other features emerge from the description and the drawings, in addition to the claims, wherein the individual features can be realized in themselves either alone or in groups in the form of sub-combinations in one embodiment of the invention and in other areas, and can constitute advantageous embodiments eligible for protection in themselves, for which protection is sought here. The subdivision of the application into individual sections and sub-headings does not restrict the general validity of the statements made under these headings.

DETAILED DESCRIPTION OF THE EXEMPLARY EMBODIMENTS

Figure 1:
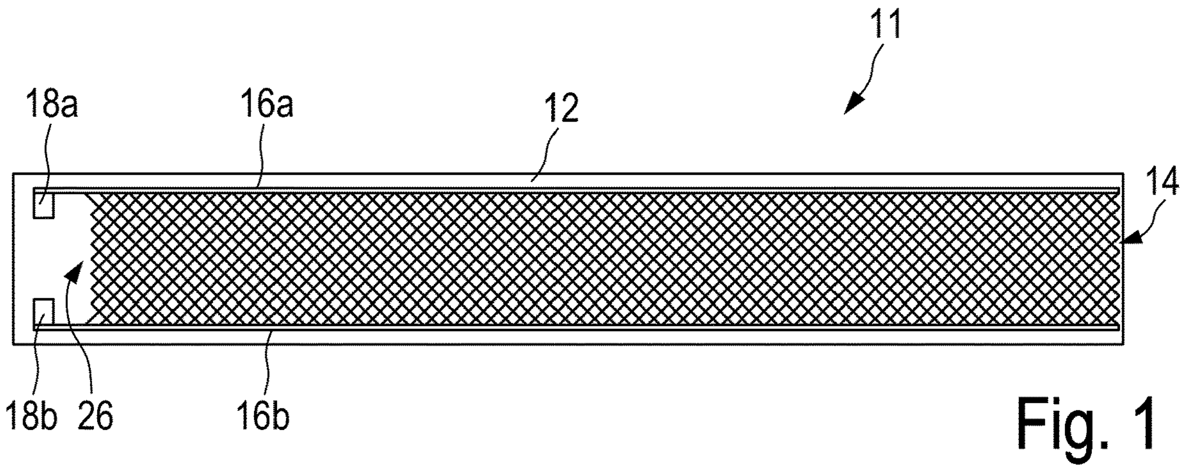
FIG. 1 shows, in a first embodiment of the invention, a plan view of a heating device according to the invention having a heating conductor assembly on a carrier.

FIG. 1 shows a heating device 11 according to the invention in a first embodiment. The heating device 11 has a large-area, rectangular, elongated carrier 12 which is designed planar. The carrier 12 can have, for example, an electrically insulating ceramic, micanite or a metal substrate with an electrically insulating surface. The heating device 11 has a lattice-shaped heating conductor assembly 14 which covers an elongated rectangular area. In this case, the heating conductor assembly 14 overlaps onto two elongate and parallel connection contacts 16*a* and 16*b* made of suitable contact material. Alternatively, it can be provided that the connection contacts 16*a* and 16*b* overlap onto the heating conductor assembly 14, that is to say are applied subsequently, as shown here. On the left, the connection contacts 16*a* and 16*b* each end in a contact pad 18*a* and 18*b* for an electrical connection, for example by soldering or welding. The heating conductor assembly 14 is advantageously produced in a thick-film method, in particular by screen printing in a known manner. This also advantageously applies to the connection contacts 16 and the contact pads 18.

Figure 2:
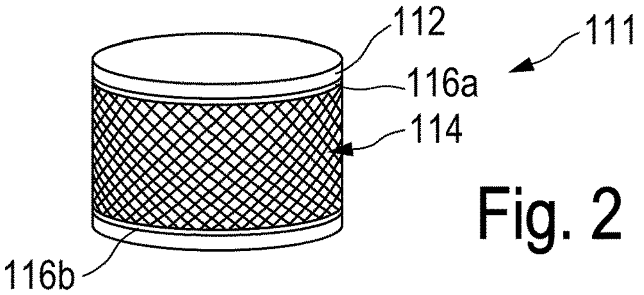
FIG. 2 shows, in a second embodiment, a heating device similar to that of FIG. 1 on a tubular carrier.

Rather than being applied to a flat carrier 12, a heating device 111 according to a second embodiment in FIG. 2 can also be applied to a tubular carrier 112. The tubular carrier 112 advantageously consists of a steel substrate with an electrically insulating surface, which can be formed, for example, by an insulating layer applied to the steel substrate. A heating conductor assembly 114 which corresponds to that of FIG. 1 per se can be applied thereto, advantageously also in a screen printing process. In this case, the illustration of FIG. 1 would be an unwound heating conductor assembly of the heating device 111 of FIG. 2.

The connection contacts 16*a* and 16*b* run parallel to one another. As can be seen from the enlarged view of FIG. 3, the heating conductor assembly 14 consists of a first plurality of heating conductors 20*a* extending from bottom left to top right and at an angle of 45° to the connection contacts 16*a* and 16*b*. Furthermore, it consists of a second plurality of heating conductors 20*b* running in a direction from bottom right to top left, which is perpendicular to the direction in which heating conductors 20*a* run and thus also has an angle of 45° to the longitudinal direction of connection contacts 16. The heating conductors 20*a* and 20*b* meet at connection points 22, one of which is represented by a dashed circle. The heating conductors 20*a* and 20*b* are therefore the short rectangular sections between the connection points 22. In these connection points 22, a film thickness is the same as that of the individual heating conductors 20*a* and 20*b*. The heating conductors 20*a* and 20*b* together with the connection points 22 are therefore not applied one after the other or separately from one another, but advantageously as a lattice pattern in a single printing process or thick-film method, advantageously with screen printing. A plurality of each heating conductors 20*a* and 20*b* runs along a line which is only interrupted by the connection points 22. Due to the uniform design of the heating conductor assembly 14, in which not only the heating conductors 20*a* and 20*b* are designed identically within the group of their same direction, but all heating conductors 20*a* and 20*b* are designed identically, apart from edge regions 26, the same current densities and thus the same area output arise over the surface of the heating conductor assembly 14 in operation.

It can be seen that in each case four heating conductors 20, namely two parallel heating conductors 20*a* and two parallel heating conductors 20*b*, form a mesh 24. The meshes 24 are rectangular or square, except for the edge regions 26, which will be explained in detail later; in particular, all meshes 24 are identical except for the edge regions 26 and adjacent to the connection contacts 16.

Figure 3:
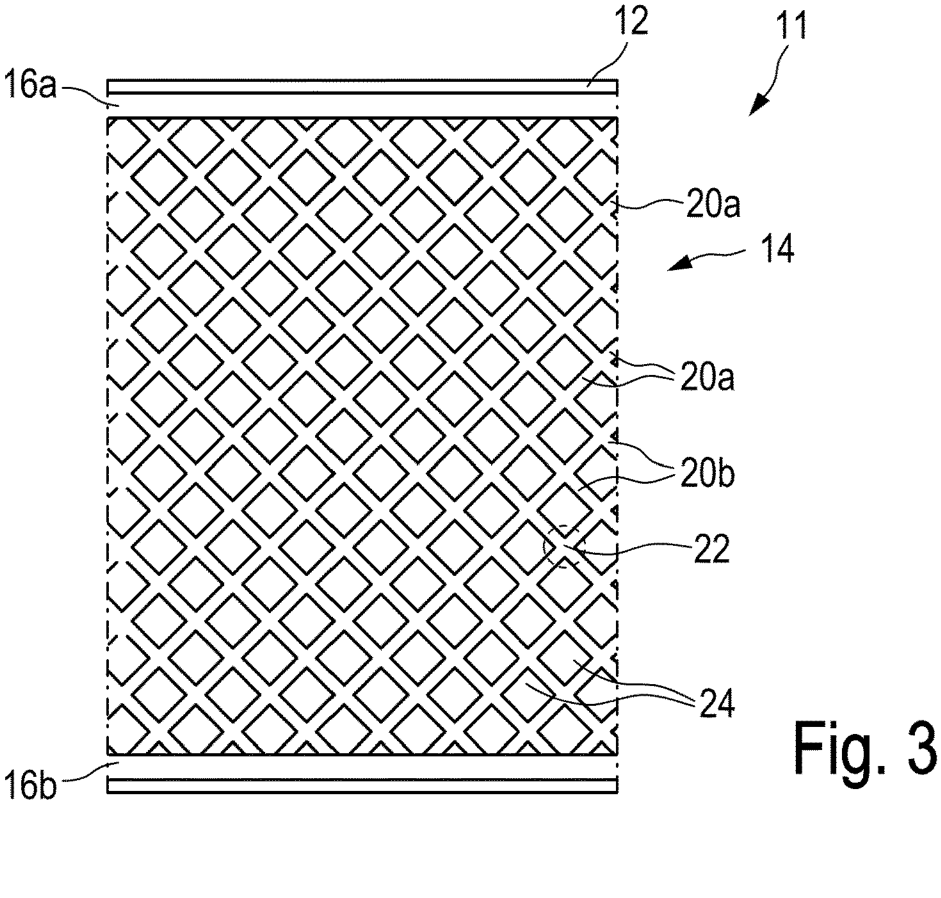
FIG. 3 shows, in a third embodiment, an enlarged view of the heating device of FIG. 1 showing the individual heating conductors that meet at connection points and form the meshes.

It can actually also be seen in FIG. 3 that even within the connection points 22 the current density is not or only insignificantly higher than in the heating conductors 20*a* and 20*b* themselves. This then also applies to heat output generation and temperature. Finally, the current that flows through one heating conductor 20*a* and one heating conductor 20*b* must flow through exactly one such connection point 22 and then flow back into one heating conductor 20*a* and one heating conductor 20*b*.

Figure 4:
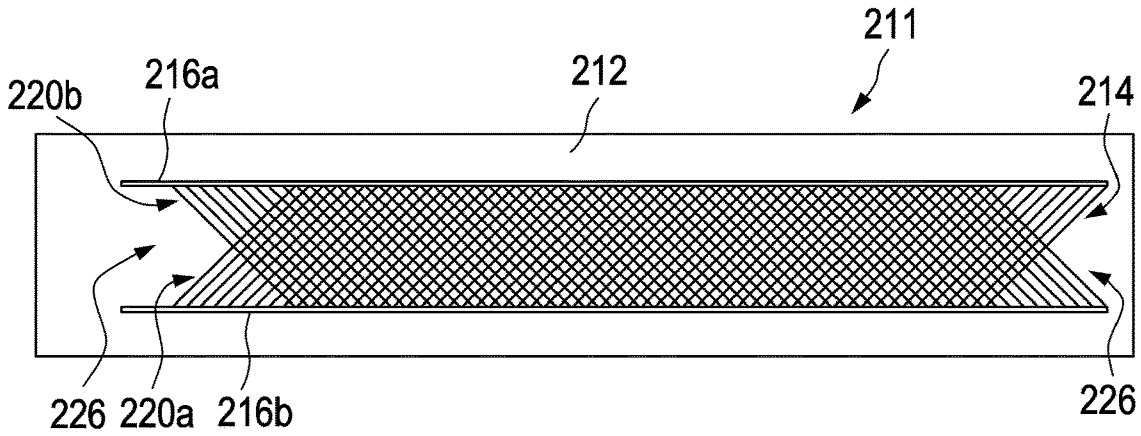
FIG. 4 shows a modification of the heating device similar to that of FIG. 1.

FIG. 4 shows a third embodiment of a heating device 211 according to the invention. A carrier 212 is not shown here with edge delimitation; in a similar form, for the sake of simplicity, no contact pads are shown at the ends of the connection contacts 216*a* and 216*b*. But these are very easy to imagine. A heating conductor assembly 214 is provided between the two elongate and parallel connection contacts 216*a* and 216*b*. In the central area, this corresponds with its lattice shape to the heating conductor assembly of FIG. 1. Only at the edge regions 226 can it be seen how here the heating conductors 220*a* and 220*b* are formed very long before they meet at connection points with heating conductors in the other direction. Since the path of the current paths between the connection contacts 216*a* and 216*b* is the same length as in the central area of the heating conductor assembly 214, except for inhomogeneities within connection points that affect the current flow there, the same or a very similar heat output can be achieved here. Nevertheless, it goes without saying that the edge regions 226 are slightly frayed on a small scale, but can generally run straight as in FIG. 1.

Figure 5:
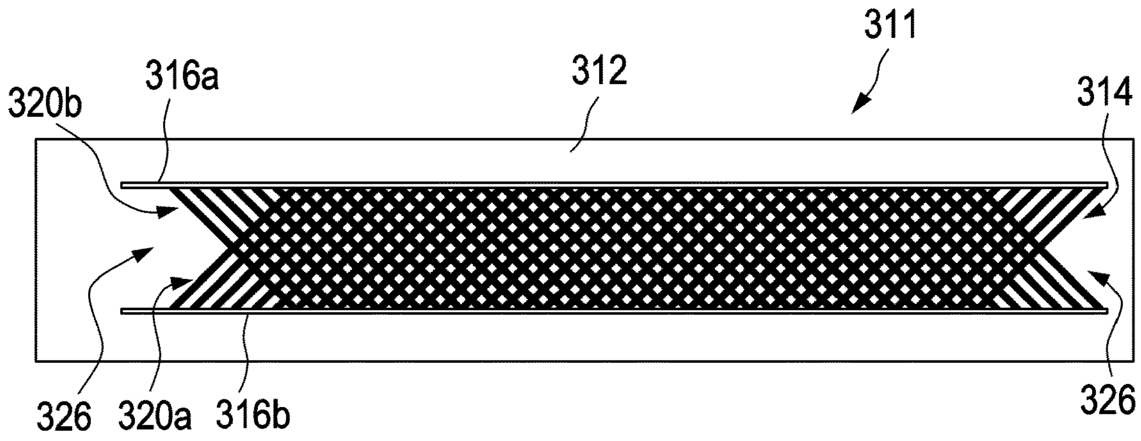
FIG. 5 shows, in a fourth embodiment, a further heating device similar to that of FIG. 4 with wider heating conductors.

FIG. 5 shows a fourth embodiment of a heating device 311 according to the invention, which essentially corresponds to that of FIG. 4, in particular within edge regions 326 of a heating conductor assembly 314. The area of the meshes is similar to that in FIG. 4, which means that due to the almost doubled width of the heating conductors 320*a* and 320*b* of the heating conductor assembly 314, fewer heating conductors are provided overall than in FIG. 4. A distance between the adjacent heating conductors in the same direction from one another can approximately correspond to their own width and is therefore approximately half that of the heating device 211 of FIG. 4.

Figure 6:
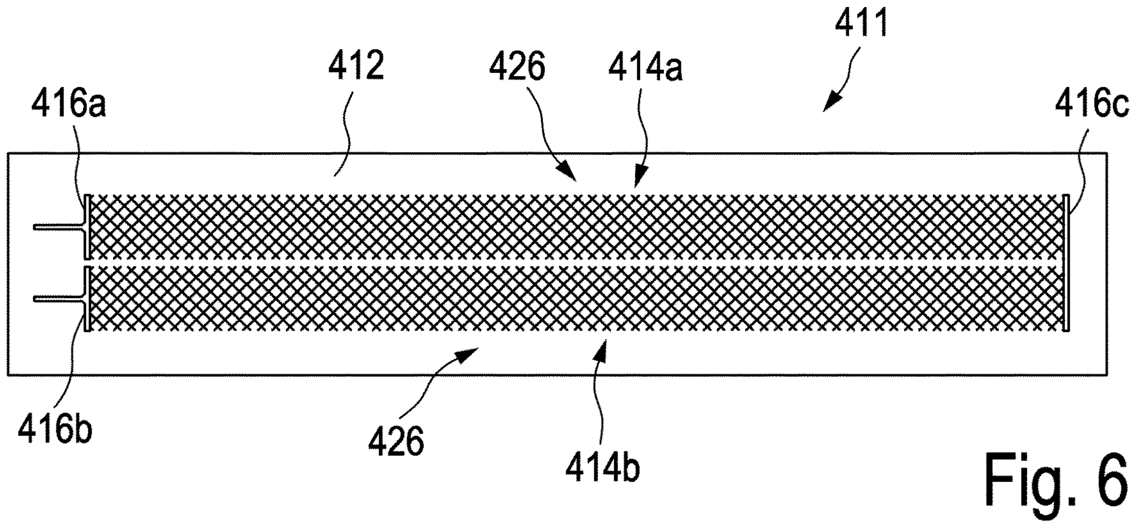
FIG. 6 shows, in a fifth embodiment, a further heating device with two identical heating conductor assemblies connected in series.

A fifth embodiment of a heating device 411 according to the invention is shown in FIG. 6. The heating device 411 has two heating conductor assemblies 414*a* and 414*b* which are apparently identical. Each heating conductor assembly 414*a* and 414*b* covers an elongate rectangular strip-shaped area. However, here the current flow is not transverse to the longitudinal direction of the heating conductor assembly 414, as in the previous embodiments, but longitudinal. Two connection contacts 416*a* and 416*b* are provided on the left, and one connection contact 416*c* is provided on the right, which connects the two heating conductor assemblies 414*a* and 414*b* to one another in series. This must be taken into account when dimensioning the specific resistance of the material of the heating conductors 420*a* and 420*b*, as well as for the supply voltage. A current path of the series circuit between the connection contacts 416*a* and 416*b* is many times longer than, for example, in the heating device of FIG. 11. Here, too, a mixture of series connection and parallel connection of the individual heating conductors 420 can be seen.

Figure 7:
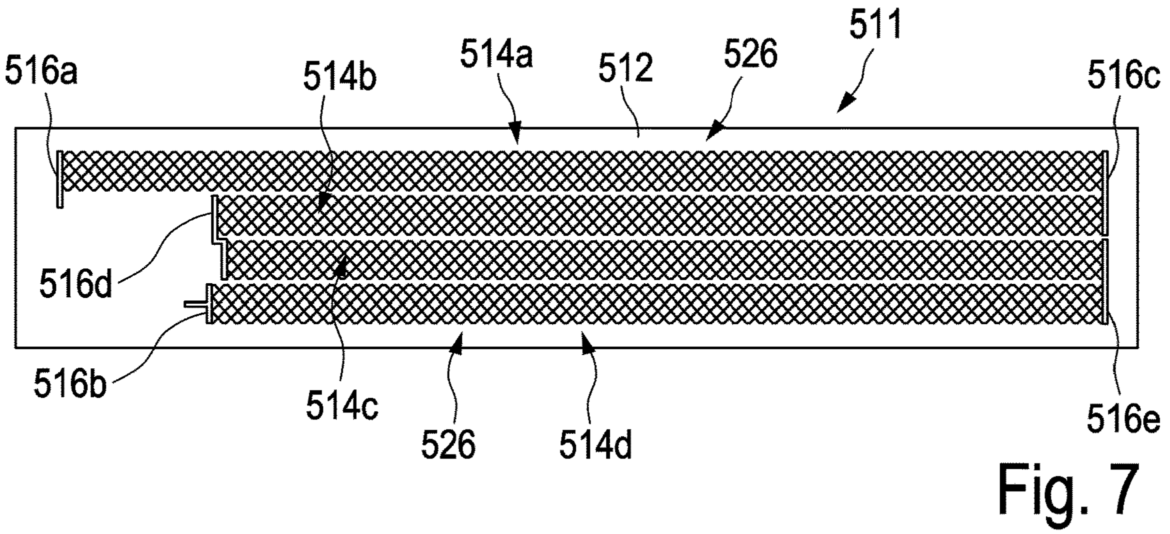
FIG. 7 shows, in a sixth embodiment, a further heating device similar to the two heating devices of FIG. 6 connected in series.

FIG. 7 shows a sixth embodiment of a heating device 511 according to the invention with two connection contacts 516*a* and 516*b* to the outside, with four heating conductor assemblies 514*a* to 514*d* being provided between them as a series connection. Further connection contacts 516*c*, 516*d* and 516*e* produce the series connection. There is thus an even greater length of a current path between the connection contacts 516*a* and 516*b* to the outside. This must be taken into account when dimensioning and especially when selecting the specific resistance for the heating conductors 520*a* and 520*b*. Furthermore, it is noticeable in the heating device 511 of FIG. 7 that there are two or at most three meshes in the direction of the width of a heating conductor assembly 514, while there are four meshes in the heating device 411 of FIG. 6 and eight full meshes in the heating device of FIG. 3. At the same time it can be seen that, unlike in the case of the heating device 411 in FIG. 6, the meshes are closed towards the edge regions, that is to say current flows through them completely and thus also contribute to the heating effect.

Figure 8:
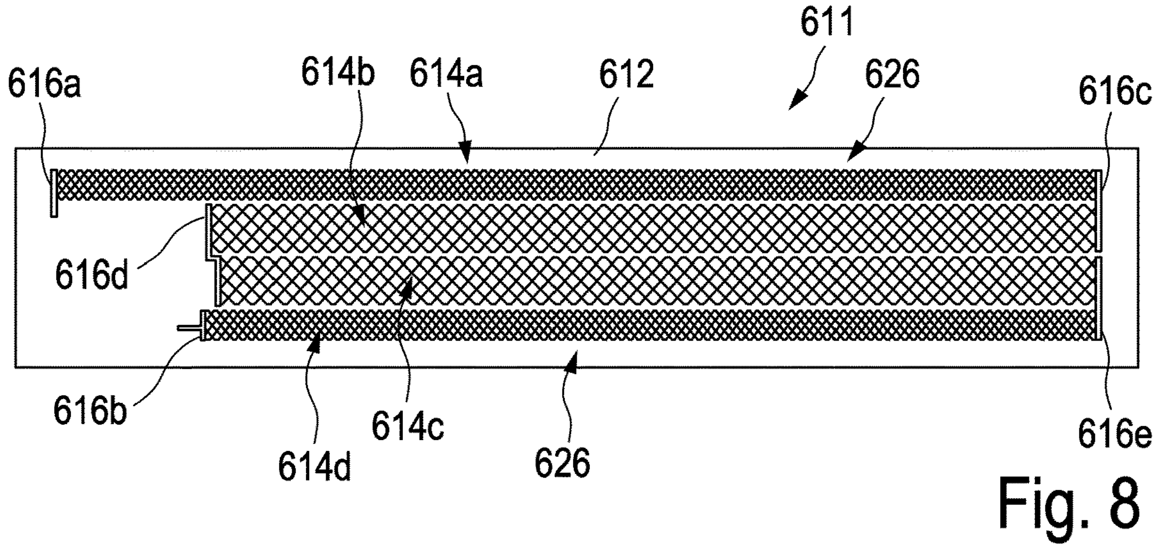
FIG. 8 shows, in a seventh embodiment, a further heating device similar to that of FIG. 7, in which, in the series, the first and the fourth heating conductor assembly are designed differently to the second and the third heating conductor assembly.

FIG. 8 shows a seventh embodiment of a heating device 611 according to the invention. It is designed similarly to the heating device 511 of FIG. 7, but here different types of heating conductor assemblies are provided on a carrier 612. A heating conductor assembly 614*a*, which is very long in relation to its width, is connected to a connection contact 616*a*. It is designed in a similar way to the heating conductor assembly 514*a* of FIG. 7, only with significantly smaller meshes. A connection contact 616*c* is provided on the right at its end, which connects it in series with the second heating conductor assembly 614*b*. The second heating conductor assembly 614*b* is almost identical to a third heating conductor assembly 614*c* which runs parallel thereto and is only slightly shorter. The two are connected via a connection contact 616*d*. The width of the heating conductor assemblies 614*b* and 614*c* also has three adjacent meshes, like the heating conductor assembly 614*a*. Also, a width of the heating conductors of the heating conductor assemblies 614*b* and 614*c* is the same as that of the heating conductor assembly 614*a*. However, the meshes are larger or have a significantly larger area. They are all closed at the edge regions.

A fourth heating conductor assembly 614*d* is connected to the heating conductor assembly 614*c* by means of a connection contact 616*e* and has the connection contact 616*b* to the outside on the left. In principle, the heating conductor assembly 614*d* is of identical design to the heating conductor assembly 614*a*, only slightly shorter. A heating device 611 can thus have a plurality of heating conductor assemblies 614*a* to 614*d*, which can generate different area output densities. The four heating conductor assemblies 614*a* to 614*d* are connected in series here, but this does not have to be the case. They could also all be electrically connected to each other in parallel or in a combination of parallel connection and series connection.

Figure 9:
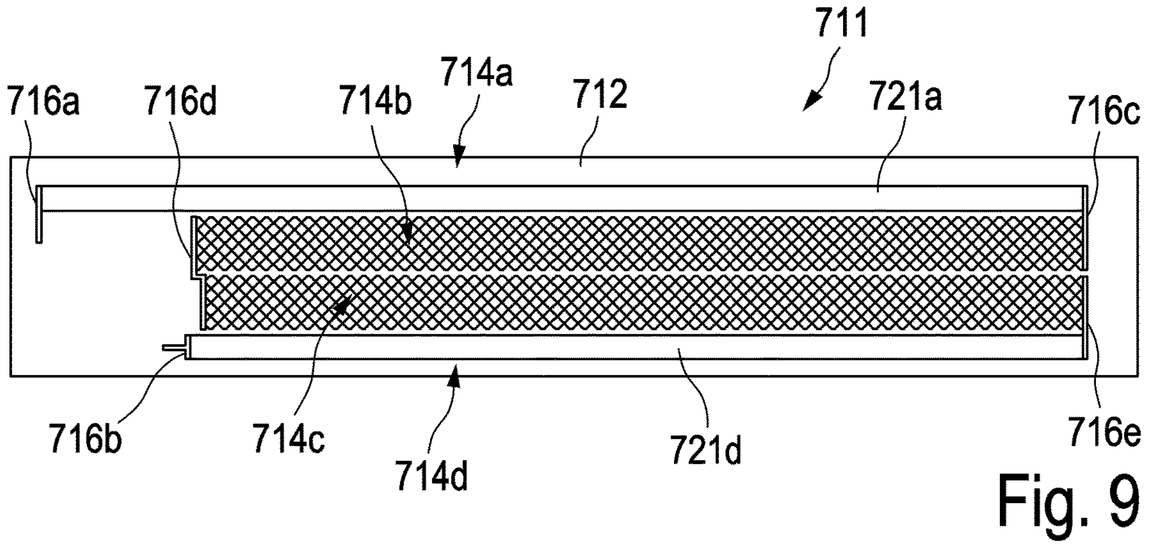
FIG. 9 shows, in an eighth embodiment, a modification of the heating device of FIG. 8, wherein the first and the fourth heating conductor assembly have been replaced by large-area heating conductors.

FIG. 9 shows an eighth embodiment of a heating device 711 according to the invention. It is designed in a manner similar to the heating device 611 of FIG. 8. However, a first heating conductor assembly 714*a* and a fourth heating conductor assembly 714*d* as the additional heating conductor assembly mentioned at the outset, each with connection contacts 716*a* and 716*b*, are designed over the entire area as elongate, strip-shaped heating conductors corresponding to the additional heating conductors mentioned at the outset. A second heating conductor assembly 714*b* and a third heating conductor assembly 714*c*, which have an identical pattern to one another but slightly different lengths, are designed in the form of a lattice with a maximum width of four meshes. Connection contacts 716*c*, 716*d* and 716*e* are provided for the electrical interconnection.

With such a heating device 711 on a carrier 712, a different distribution of different area outputs can be achieved compared to FIG. 8. In this way, the first heating conductor assembly 714*a* and the fourth heating conductor assembly 714*d* can generate very high area outputs, which are desired in the areas they cover. In the strip-shaped area in between, in which the heating conductor assemblies 714*b* and 714*c* run, the area output can be somewhat lower, but it can still be distributed very evenly. The heating conductor assembly 714*a* is formed by a single wide heating conductor 721*a*. Correspondingly, the heating conductor assembly 714*c* is formed by a single wide heating conductor 721*d*.

Figure 10:
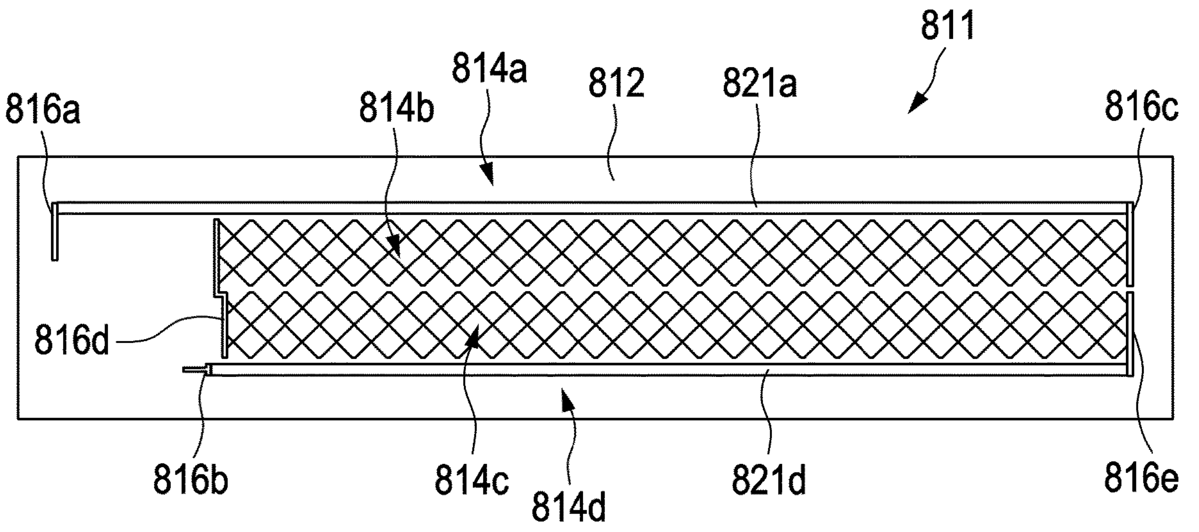
FIG. 10 shows, in a ninth embodiment, a modification of the heating device of FIG. 9 with very narrow first and fourth heating conductors and a second and third heating conductor assembly in between with very large meshes.

A ninth embodiment of a heating device 811 according to the invention is shown in FIG. 10, which is designed similarly to the heating device 711 of FIG. 9. Two heating conductor assemblies 814*a* and 814*d* are formed on a carrier 812, which can be electrically contacted from the outside by means of two connection contacts 816*a* and 816*b*. The heating conductor assemblies 814*a* and 814*d* or the heating conductors 821*a* and 821*d* are, so to speak, formed over the entire area, but are significantly narrower than in FIG. 9. They are connected in series with a second heating conductor assembly 814*b* and a third heating conductor assembly 814*c* via connection contacts 816*c*, 816*d* and 816*e*. The heating conductor assemblies 814*b* and 814*c* are lattice-shaped, but with very large meshes and a width of the heating conductors corresponding to FIG. 9. A maximum of two meshes are provided here in the direction of the width of the heating conductor assemblies 814*b* and 814*c*. However, there is a noticeably lower area output than with the heating device 711 in FIG. 9.

The heating conductor assembly 814*a* is formed by the single heating conductor 821*a*, and the heating conductor assembly 814*d* is formed by the single heating conductor 821*d*. Here too, similar to the heating device 711 in FIG. 9, a relatively high area output can be generated in a strip-shaped area. In the area in between, that is to say where the heating conductor assemblies 814*b* and 814*c* run, the area output is advantageously significantly lower, for example lower by a factor of 2 to 4.

Figure 11:
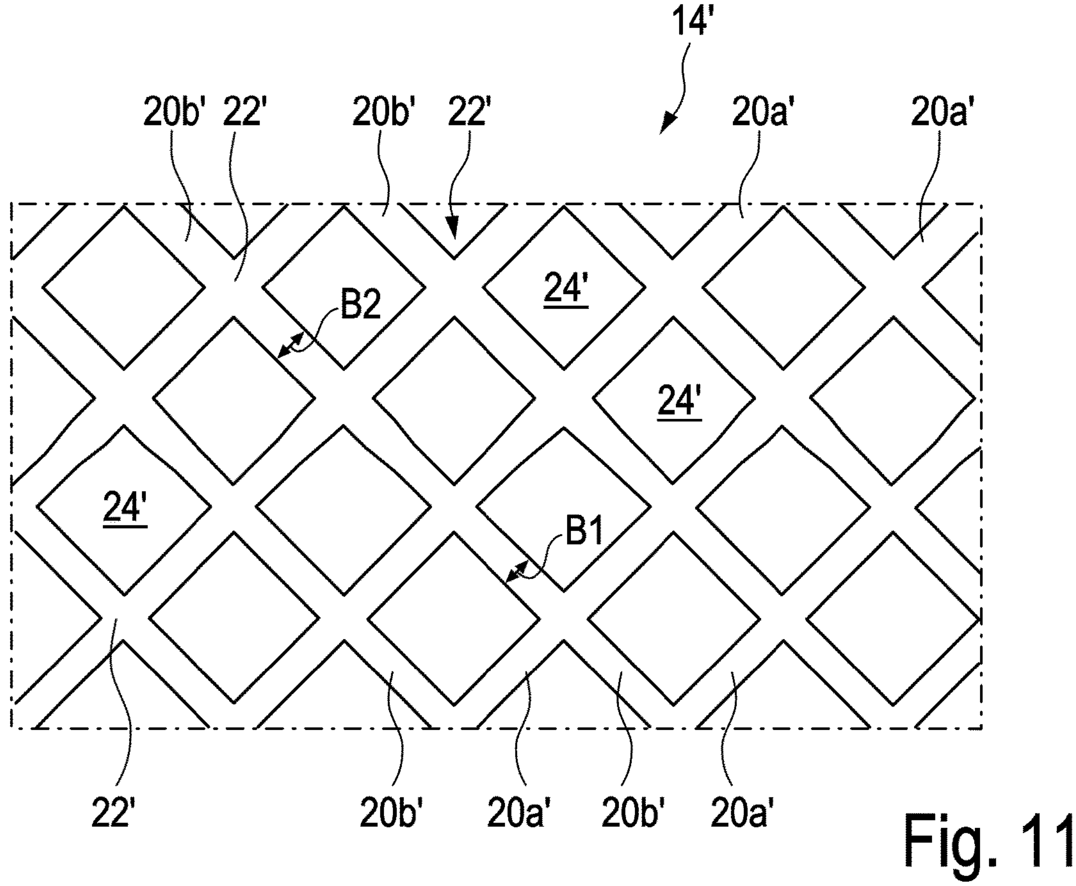
FIG. 11 shows a highly enlarged view of the heating conductor assembly similar to that of FIGS. 1 and 3 with a variation in the width of the heating conductors.

FIG. 11 shows an enlarged view of a heating conductor assembly 14' to clearly show once again how heating conductors 20*a'* running in a direction from bottom left to top right and heating conductors 20*b'* running in a direction perpendicular thereto each form meshes 24'. Each mesh 24 is thus surrounded by four heating conductors 20' and four connection points 22'. Above all, it can be seen here how the width of the heating conductors 20*a'* and 20*b'* can vary. In the lower area, the heating conductors 20*a'* and the heating conductors 20*b'* have a width B1. The width B1 can be 0.4 mm, for example. The bottom row of fully illustrated meshes 24' is exactly square.

In the second row of fully illustrated meshes 24' seen from below, the width of the heating conductors 20*a'* and 20*b'* increases to a width B2 which can be 0.5 mm, for example, i.e., 25% greater than the width B1. This increase in width is strictly monotonic, but not exactly continuous or uniform. At a short distance from each connection point 22', for example corresponding approximately to the respective width of the heating conductors 20*a'* and 20*b'*, these heating conductors have a constant width before the width begins to increase. Thus, the second row and third row of meshes 24' starting from the bottom are not exactly square, only the top fourth row of fully illustrated meshes 24' is again exactly square. Since the distance between the longitudinal center axes of the heating conductors 20*a'* and 20*b'* does not change, but only the width of the heating conductors, so to speak, the area of a mesh 24' in the top row is somewhat smaller than that of a mesh 24' in the bottom row. However, the change in the width of the heating conductors 20*a'* and 20*b'* primarily affects their electrical resistance and thus the heat output they generate. This means that if the current flow remains the same, which must be the case, there is a higher area output in the lower area than in the upper area with the wider heating conductors.

Based on FIG. 11 it is easy to imagine how the width of the heating conductors can also vary several times or, for example further up, can also decrease again to the width B1 or a different or smaller width again. It is also easy to imagine that only the heating conductors in one direction have a varying width, while the heating conductors in the other direction have a constant width.

It is also easy to see in FIG. 11 that the variation in the electrical resistance of the heating conductors can be achieved very easily by varying the width and is in particular easier than varying their length, which would be very difficult within a lattice which is as regular as possible. Also, varying the film thickness in a thick-film method is very difficult and technically not easy to achieve consistently. In contrast, the illustrated variation in the width of the heating conductors is relatively easy to achieve.

Figure 12:
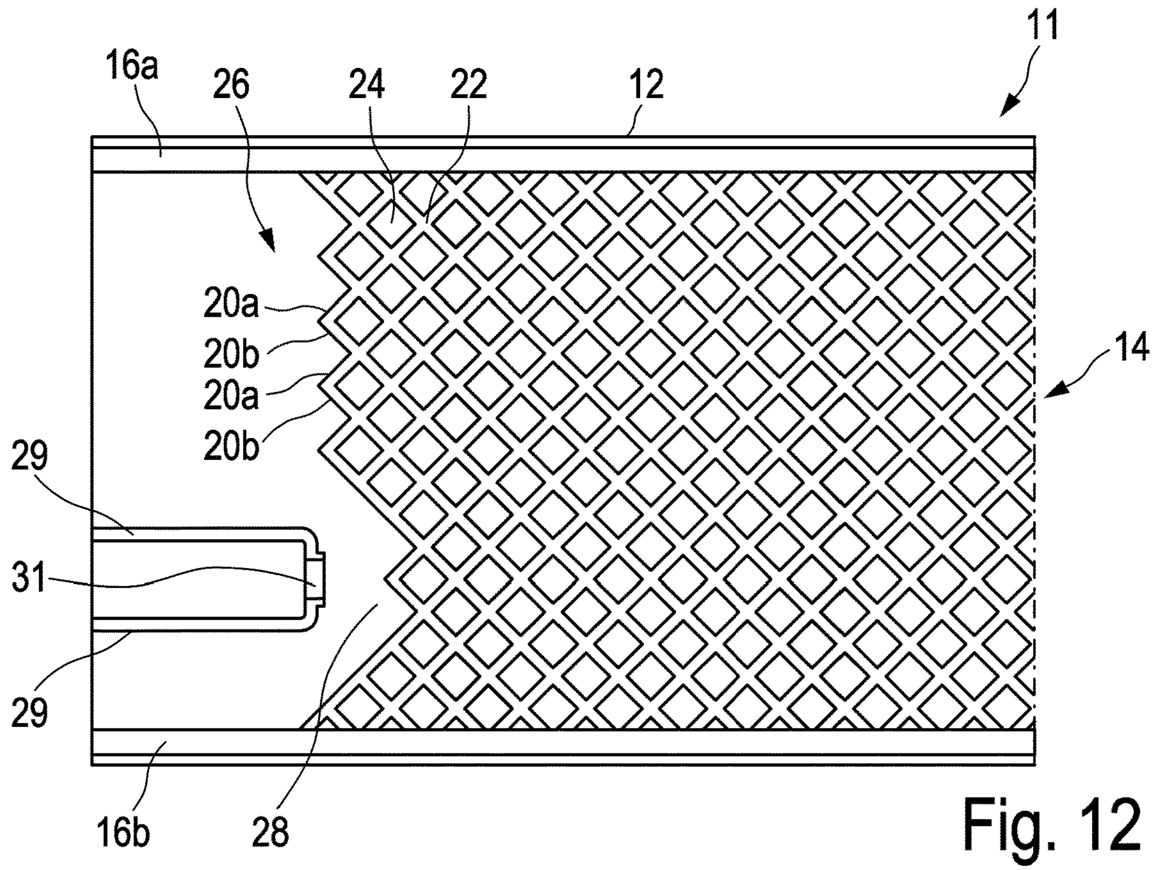
FIG. 12 shows an illustration of a recess in an edge region of the heating conductor assembly similar to that of FIG. 3, wherein conductor tracks with connections for a temperature sensor protrude laterally into this recess.

In FIG. 12, in an enlarged view similar to FIG. 3, an edge region 26 is shown for a heating device 11'. The heating conductor assembly 14 here has heating conductors 20*a* and 20*b*, which form closed meshes 24. A recess 28 is provided in the lower area, here some heating conductors or some meshes are missing, namely five meshes. The recess 28 is in turn delimited to the right by heating conductors or closed meshes. From the left protruding into the recess 28 or towards it, is an assembly of two conductor tracks 29, which lead to a temperature sensor 31, shown here as a soldered SMD component. The temperature sensor 31 can be used to determine a temperature in this area on the carrier 12, for example when the carrier 12 is in direct contact with water on its side facing away from the heating conductor assembly 14 in order to heat it. Due to the slightly increased distance between the heating conductors 20 and the temperature sensor 31 due to the recess 28, the temperature signal is not falsified by the direct heat output of the heating conductors 20*a* and 20*b*. At the same time, the temperature sensor 31 does not have to be too far away from them, as a result of which it would not measure the correct temperature of the water or the like heated by the heating conductor assembly 14. Furthermore, it can be seen in FIG. 12 that such a recess 28 in the otherwise regular heating conductor assembly 14 can be used to achieve an area with reduced area output or heat output generation.

Figure 13:
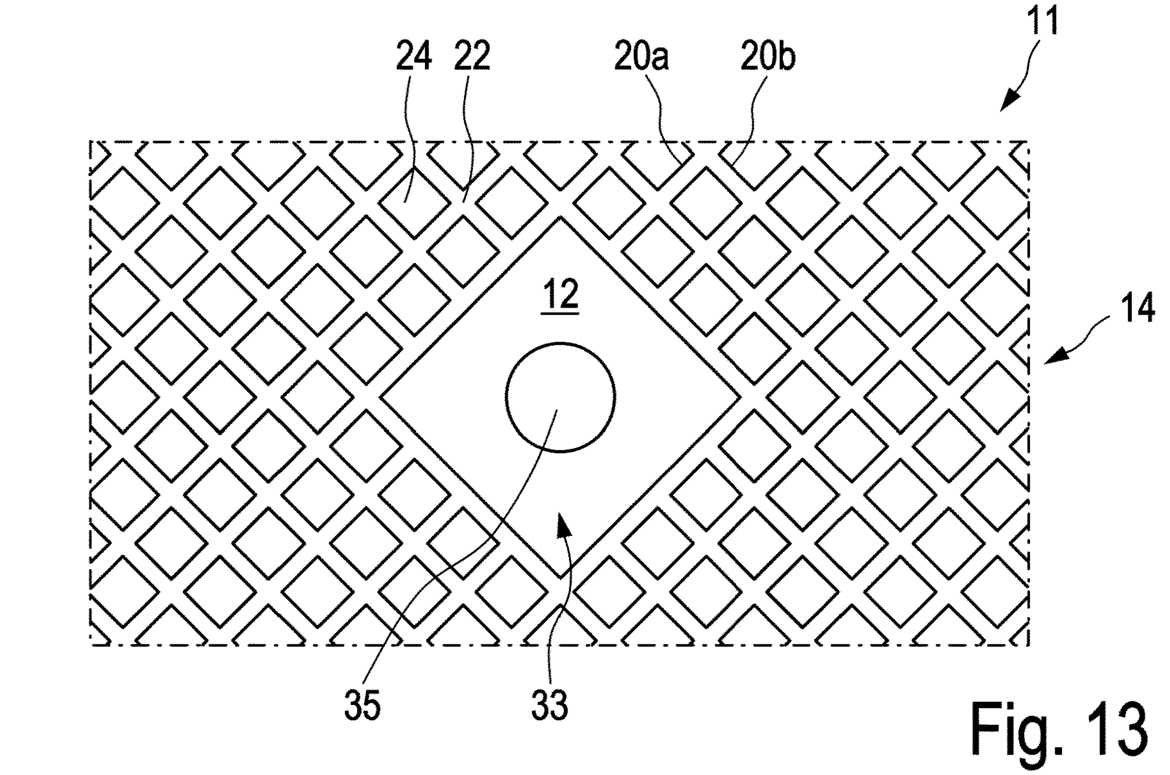
FIG. 13 shows an enlarged heating conductor assembly with a free surface area which is completely surrounded by heating conductors, wherein a bore is provided in this free surface area.

Another possible development of the invention is shown in FIG. 13 for a heating device 11 with a heating conductor assembly 14. A so-called free surface area 33 is formed here within the otherwise regular heating conductor assembly 14 with heating conductors 20*a* and 20*b* running in different directions, which form meshes 24 between them. This has been described above. The free surface area 33 is free of heating conductors 20*a* and 20*b* or their meshes 24. Here, so to speak, 16 meshes or the heating conductors that would otherwise form them are missing. A bore 35 is provided in the free surface area 33, to which a bolt can be fastened, for example, or a medium passage can be created. Instead of such a bore 35, which runs through a carrier 12 of the heating device 11, a fastening point for a bolt or the like can also be welded, alternatively an electrical contact can be provided. Due to the distance between the heating conductors 20*a* and 20*b* and the bore 35, a temperature in this area can be adjusted in accordance with a heat output; in particular, the temperature can be reduced somewhat.

Figure 14:
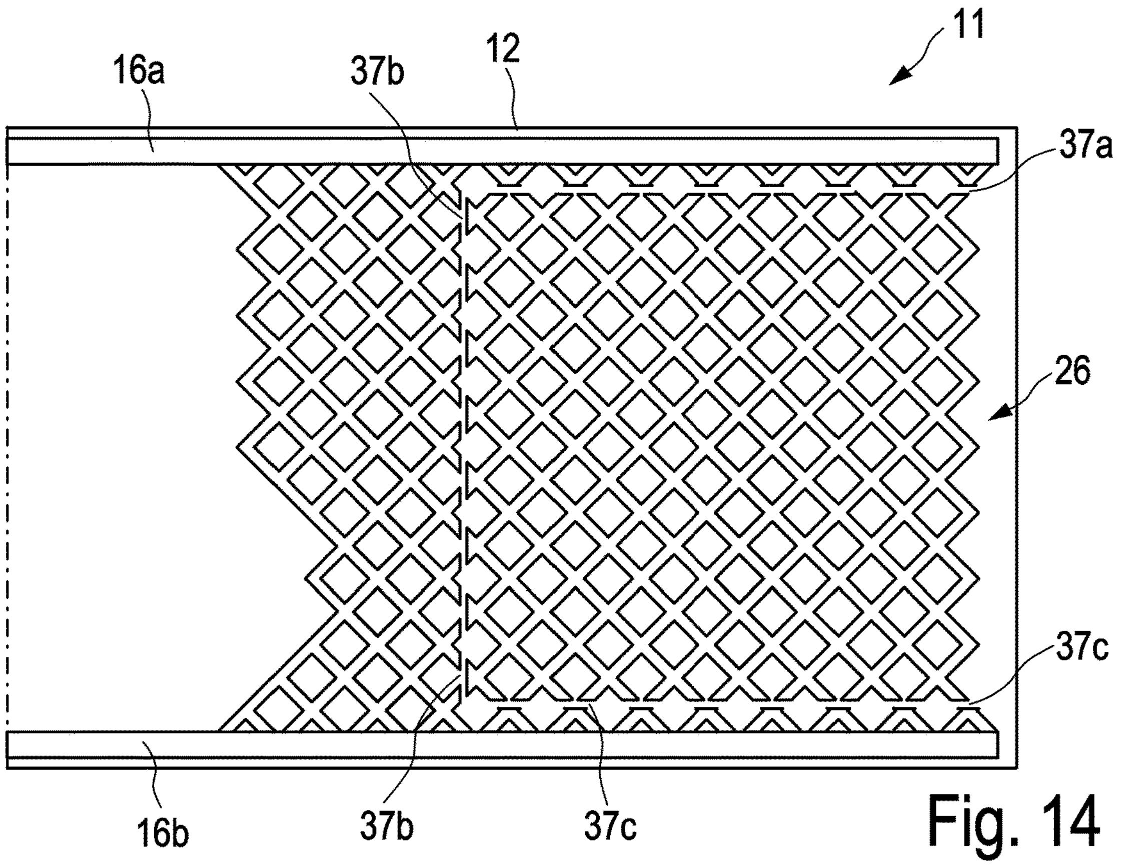
FIG. 14 shows the heating conductor assembly similar to that of FIG. 3 with a C-shaped free-cut, which separates an area of heating conductors from the rest of the heating conductor assembly.

FIG. 14 shows as an extension of the heating conductor assembly 14 similar to FIGS. 1 and 3 how an electrical adjustment of a resistance value can take place in a heating conductor assembly 14 which has been described with reference to these figures. In the right area, a free cut with free cut sections 37*a* to 37*c* is shown adjoining the right edge region 26, which runs as a free cut section 37*a* starting at the right edge region 26 at a small distance from the upper connection contact 16*a* and parallel thereto to the left. It cuts through fifteen heating conductors 20 or stretches across eight meshes in the horizontal direction. Then it bends down at a right angle and cuts through sixteen heating conductors 20 as a free cut section 37*b*. It runs until just before the lower connection contact 16*b* and then goes again at right angles to the right as a free cut section 37*c*, that is to say parallel to the connection contact 16*b* at a small distance, as above. As a result, an area of heating conductors 20 and meshes 24 is electrically separated from the rest of the heating conductor assembly 14. The electrical resistance of the heating device 11 or the heating conductor assembly 14 between the connection contacts 16*a* and 16*b* is thus increased, as a result of which the overall heat output is reduced.

It is easy to see that this free cut does not necessarily have to have the three free cut sections 37*a-c* mentioned. It would also be similarly effective if only the two free cut sections 37*a* and 37*b* were provided parallel to the connection contacts 16*a* and 16*b*. Then some of the heating conductors 20, which are now separated by the vertical free cut section 37*b*, would still be electrically contacted. However, due to the longer current path, the current would flow through them to a significantly lesser extent or hardly at all and they would therefore not develop any significant heating effect. Such a simplified free cut can save a certain amount of effort. The same would apply if only the central vertical free cut section and one of the other two free cut sections were cut free. Admittedly, the complete free cut 37 shown in FIG. 14 can influence the heating conductor assembly 14 in an exact and precisely predeterminable manner.

Figure 15:
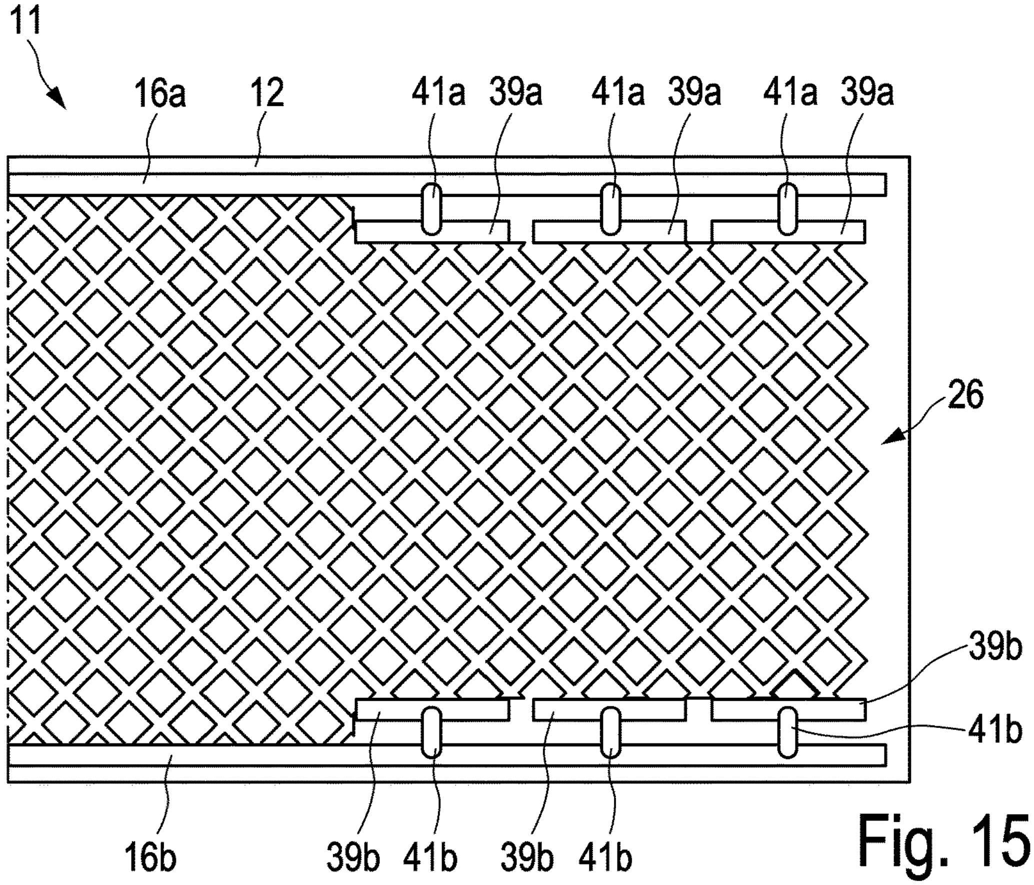
FIG. 15 shows a further possible modification of a heating device similar to that of FIG. 1 with secondary connection contacts parallel to the connection contacts, which are electrically connected thereto by means of bridge contacts which can be severed.

A further possibility of influencing the electrical resistance in a heating device 11 is shown in the modification of FIG. 15. In itself, the heating conductor assembly 14 is formed between the connection contacts 16*a* and 16*b* as previously described. In the right area or towards the right edge region 26, three elongate secondary connection contacts 39*a* are provided at a small distance and parallel to the upper connection contact 16*a*, which can consist of the same material, for example. The distance from the connection contact 16*a* can be small and roughly correspond to its width. An electrical connection between the connection contact 16*a* and the secondary connection contact 39*a* is established in each case via a bridge contact 41*a*. This advantageously consists of a different material than the connection contact 16*a* and secondary connection contacts 39*a*, which should be electrically similarly conductive, but mechanically less resistant. It can thus easily be severed by scribing or by means of a laser, so that the bridge contacts 41*a* can also be severed or removed relatively easily.

In a corresponding manner, close to the lower connection contact 16*b*, three parallel secondary connection contacts 39*b* are provided, each of which is electrically connected to the connection contact 16*b* via a bridge contact 41*b*. A length of the current path between the secondary connection contacts 39*a* and 39*b* is approximately seven full meshes 24 somewhat less than directly between the connection contacts 16*a* and 16*b*. By disconnecting the bridge contacts 41*a* and/or 41*b*, advantageously starting on the right towards the edge region 26 and towards the left, certain sections or regions of the heating conductor assembly 14 can be separated in a manner similar to that shown in FIG. 14 and the free cut. Thus, the heat output generated at the connection contacts 16*a* and 16*b* with a fixed predetermined voltage can be adjusted. As an alternative to cutting through the bridge contacts 41*a* and 41*b*, the connection contacts 16*a* and 16*b* could also be interrupted in the longitudinal direction, with this interruption then being closed by means of corresponding extra bridge contacts applied and thus being electrically bridged. When these bridge contacts are then severed, a reduction or miniaturization of the heating conductor assembly 14 and an increase in the electrical resistance is also possible.

Alternatively, no such bridge contacts could be provided from the start, but only after measuring the electrical resistance they are provided exactly where they are needed so that a desired electrical resistance can be achieved. Unnecessary material costs can thus be saved.

Figure 16:
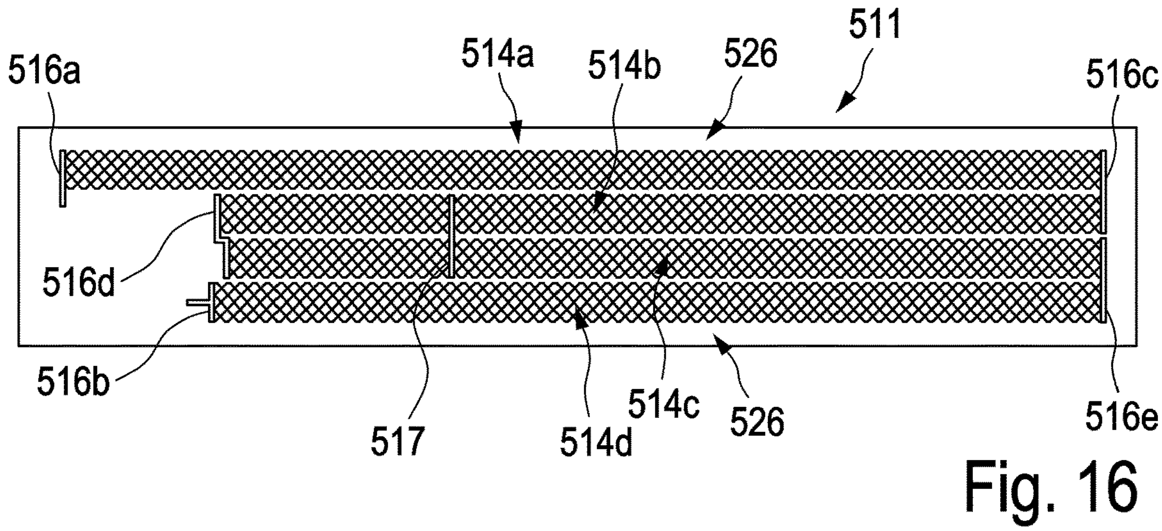
FIG. 16 shows a modification of the heating device of FIG. 7 with an intermediate contact which is provided within the second and third heating conductor assembly.

FIG. 16 shows a modification of the heating device 511 corresponding to FIG. 7. Here, with a direction transverse to the longitudinal direction of the central heating conductor assemblies 514*b* and 514*c*, an intermediate contact 517 is provided, which acts as it were like a connection contact 516*d* shifted to the right. The intermediate contact 517 should consist of a material with good electrical conductivity, similar to the connection contacts 516. Thus, the regions of the heating conductor assemblies 514*b* and 514*c* to the left thereof are electrically deactivated or no longer have current flowing through them. As a result, the length of the heating conductor assemblies 514*b* and 514*c* and thus their electrical resistance between the connection contacts 516*c* and 516*e* is shortened and the electrical resistance is thus reduced. This can also be a type of electrical adjustment or change in the heat output. Such an intermediate contact 517 may be applied above the heating conductor assemblies 514*b* and 514*c*, for example printed on or glued on, later on. In this way, the entire heating resistance can be adjusted.

Figure 17:
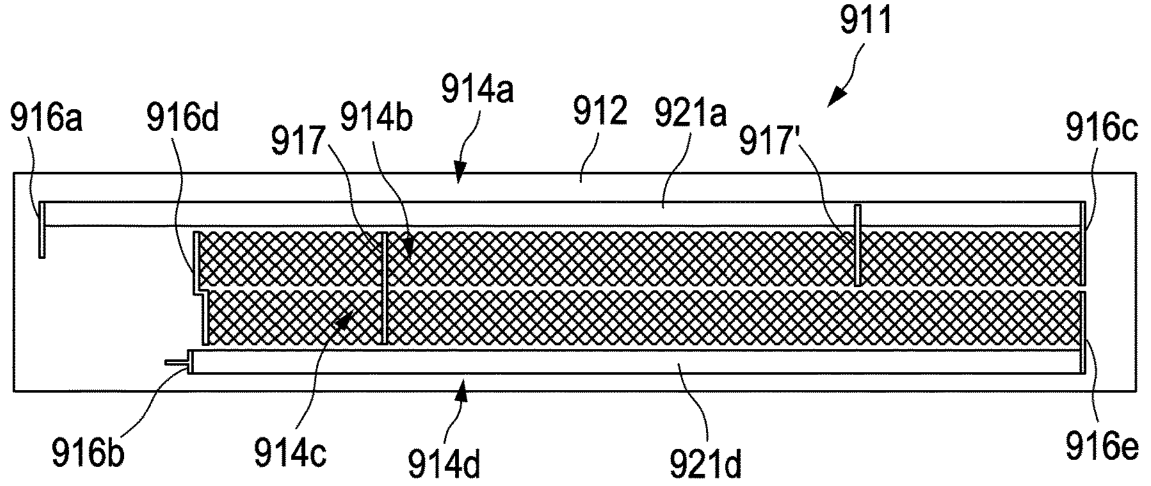
FIG. 17 shows, in a tenth embodiment, a modification of a heating device similar to that of FIG. 9 with two intermediate contacts according to FIG. 16.

A tenth embodiment of a heating device 911 according to the invention is shown in FIG. 17, which is designed in principle similar to the heating device of FIG. 9 or FIG. 10. Two full-area heating conductor assemblies 914*a* and 914*b* are provided as heating conductors 921*a* and 921*d* in parallel and at a distance from one another on a carrier 912. Several connection contacts 916*a* to 916*e* are provided, which form a series connection with the heating conductor assemblies 914*b* and 914*c* which are arranged between the heating conductors 921*a* and 921*d* and each have a lattice shape and a width of three meshes 924. Similar to FIG. 16, an intermediate contact 917 is provided slightly to the right of the connection contact 916*d*, which causes a direct electrical connection. The region of the heating conductor assemblies 914*b* and 914*c* to the left of this is thus separated. Similarly, an intermediate contact 917' is provided between the heating conductor 921*a* and the heating conductor assembly 914*b*. This intermediate contact 917' acts like a connection contact 916*c* shifted to the left, namely also as a shortening of the respective heating conductor assemblies. Thus, such a shortening by means of an intermediate contact can be provided not only between lattice-shaped heating conductor assemblies, but also between a lattice-shaped heating conductor assembly 914*b* and a wide, full-area heating conductor 921*a*.

Figure 18:
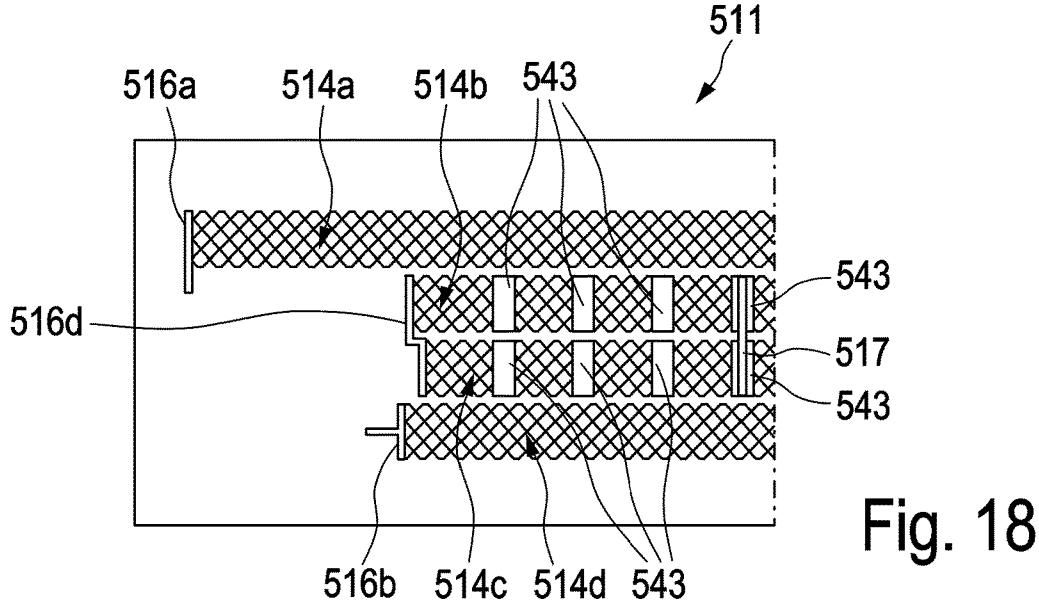
FIG. 18 shows a modification of the heating device of FIG. 16 with large-area contacts which are arranged on the second and the third heating conductor assembly.

As a further modification of a heating device 511 similar to FIG. 7, FIG. 18 shows how a plurality of large-area contacts 543 can be provided via exactly one heating conductor assembly 514*b* or 514*c* in each case. The large-area contacts 543 can consist of the material of the connection contacts 516, alternatively of a material with very good electrical conductivity, which can also be contacted easily or well on its surface. In this case, pairs of these large-area contacts 543 are provided on the two heating conductor assemblies 514*b* and 514*c* in extension to one another. They are used so that an intermediate contact 517 can be applied to such a pair, similar to FIGS. 16 and 17. Electrical contacting with these large-area contacts 543 is then much better possible than with the heating conductor assemblies 514 themselves. A length of the two heating conductor assemblies 514*b* and 514*d* can thus be varied at one of four points, so to speak, by short-circuiting as a possibility for a relatively precisely graded predetermined electrical tuning. The large-area contacts 543 therefore serve to simplify or improve the application of the intermediate contacts 517.

In general, it is considered significant for the invention that the lattice shape of the heating conductor assembly of the heating device according to the invention can be created, so to speak, by an intersecting or overlapping of straight heating conductors. However, a film thickness of the entire heating conductor assembly should remain the same as far as possible, in particular both in the region of the heating conductor itself and in the region of such a connection point. It is then both easier to manufacture and to provide heat output that is generated as uniformly as possible.

Special thick-film pastes, which can contain graphite, can be used as material for the production of the heating conductors, in particular for production using the thick-film method. Alternatively, other materials with good electrical conductivity can be used, which can be used advantageously for the production of heating conductors.

Figure 19:
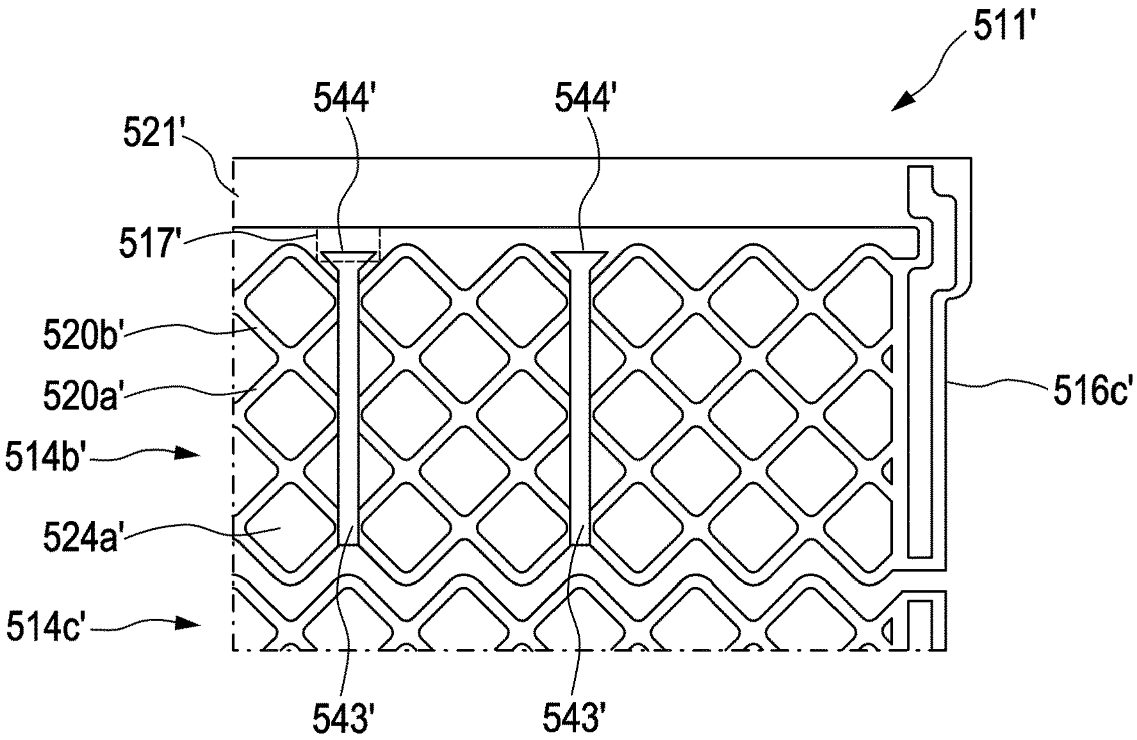
FIG. 19 shows a modification of the heating device of FIG. 18 with very narrow large-area contacts which are arranged on the second and the third heating conductor assembly.

As a further modification of the heating device of FIG. 18, FIG. 19 shows how large-area contacts 543' are designed to be very narrow in a heating device 511' according to the invention. Similar to FIG. 18, these large-area contacts 543' cross over the full width of a heating conductor assembly 514*b*', which is basically designed similarly to that in FIG. 18. It is clearly visible that these large-area contacts 543' are designed a lot narrower than in FIG. 18. They can also consist of a material of connection contacts 516*c*', alternatively of a very good electrically conductive material, which in turn can be contacted easily or well on its surface. A narrow, full-area heating conductor 521*a*' runs parallel to the heating conductor assembly 514*b*', for example similar to FIG. 17.

For electrical contacting as described above for electrical adjustment, one of the two narrow large-area contacts 543' can be provided by means of an applied, in particular printed, intermediate contact as a type of contact bridge, as indicated on the left with the intermediate contact 517' in dashed lines. Thus, the heating conductor 521*a*' and the heating conductor assembly 514*b*' can be shortened as an electrical resistance adjustment as previously described. Due to the narrow configuration of the large-area contacts 543', little material is required for them while at the same time having sufficiently good electrical conductivity. Furthermore, the current flow and the heating behavior in the heating conductor assembly 514*b*' are impaired as little as possible. In the upper region, the large-area contact 543' has a widening 544', which so to speak follows that of the two adjacent heating conductors 520' in terms of shape, i.e., makes maximum use of the available surface. As a result of this widening and thus enlargement of the region available at the widening 544', the intermediate contact 517' shown in dashed lines can overlap more widely and thus make better electrical contact. It is also easier to hit large-area contacts 543' with an intermediate contact 517', so to speak.

Figure 20:
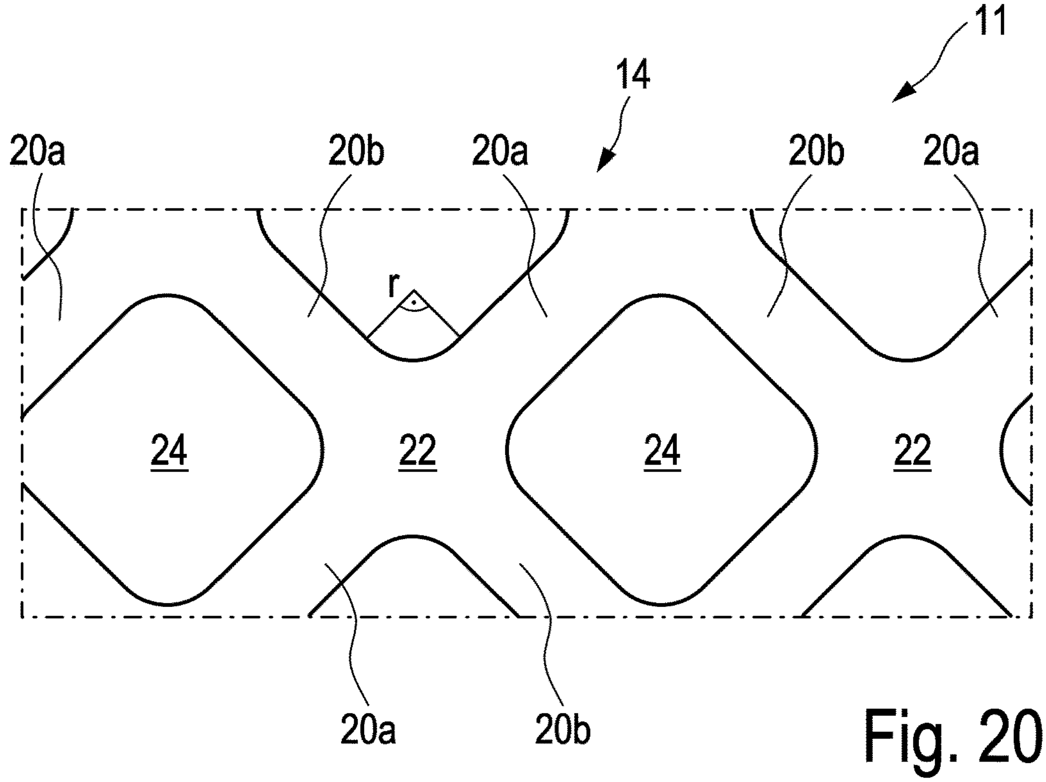
FIG. 20 shows an enlarged view of meshes of heating conductors with rounded angles in the corners.

FIG. 20 shows a large enlargement of a heating conductor assembly 14 with heating conductors 20*a* and 20*b* which form meshes 24 between them. As a special feature, the meshes 24 are rounded in the corners or in their angles with a radius r, which is shown as an example. The rounding or chamfering is uniform everywhere within a mesh 24 and within all meshes 24. The radius r is approximately 70% of the width of the heating conductors 20*a* and 20*b*, all of which have the same width. Due to this rounding with the radius r, a simpler production or improved production is possible on the one hand. Completely pointed corners, as can be seen, for example, from the enlarged view of FIG. 11, are not easy to produce in the case of small structures of the stated widths of the heating conductors 20 in the range of less than 1 mm, for example 0.4 mm or 0.5 mm, using a screen printing process which is a proven process for thick-film methods. This can be improved, so to speak, by the rounding.

Furthermore, the region of the connection points 22 can be increased by this rounding, so that no current constriction with increased current concentrations can occur here in the corners, which could lead to damage. Furthermore, the generation of heat output can then be reduced in the region of the connection points 22. A temperature increase in the region of the corners, which would occur without rounding, can amount to 4° C. and even more. This can be reduced or prevented by the rounding. An excessive increase in temperature in the region of the connection points 22 can also be reduced to less than 4° C., as a result of which it no longer has a harmful effect or is hardly noticeable.

Figure 21:
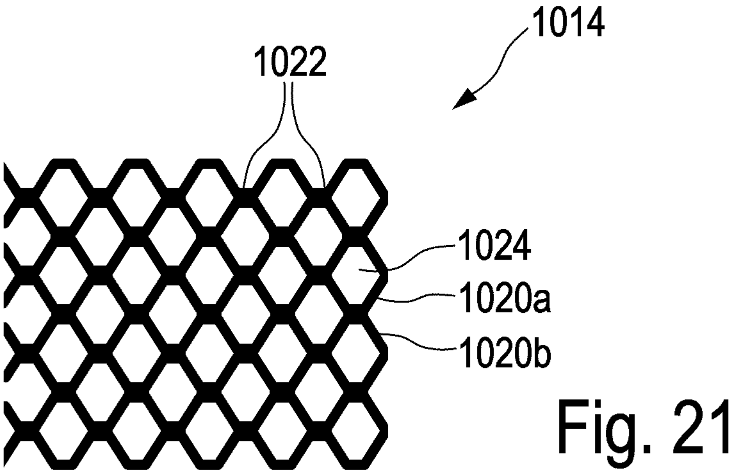
FIG. 21 shows a modification of the heating device of FIG. 3 with quasi-hexagonal narrow meshes.

FIG. 21 shows a modification of a heating conductor assembly 1014, which can be viewed as a lattice or as a lattice pattern similar to the heating conductor assembly 14 of FIG. 3. However, meshes 1024 formed by the heating conductors 1020*a* and 1020*b* are approximately hexagonal or in the form of a honeycomb. Alternatively, they could also be considered diamond-shaped. This results from the fact that although the individual heating conductors 1020*a* and 1020*b* run in parallel directions to one another, they are each offset somewhat parallel to one another, starting from a connection point 1022, specifically offset by approximately their respective width. As a result, the connection points 1022 also have a larger surface area than just the area of two intersecting heating conductors 1020*a* and 1020*b*, for example according to FIG. 6. It can also be seen in FIG. 21 that the heating conductors 1020*a* are approximately at an angle of 120° to one another, which is to be expected given the regular pattern.

Figure 22:
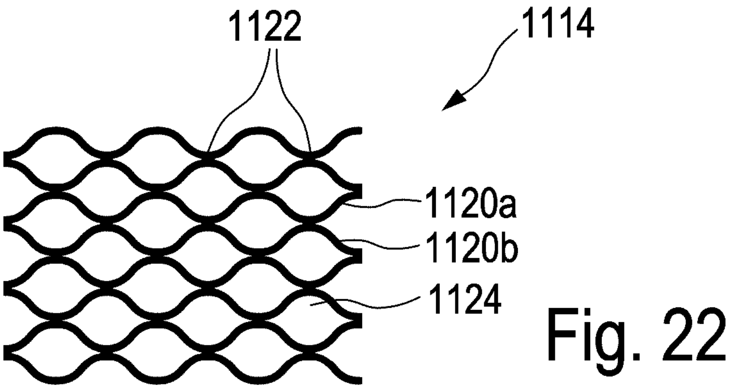
FIG. 22 shows a modification of the heating device of FIG. 3 with individual heating conductors bent in an S-shape.

Another alternative modification of a heating conductor assembly 1114 is shown in FIG. 22. This corresponds to the further aspect of the invention described above, that the heating conductors 1020*a* and 1020*b* do not run in a straight manner between individual connection points 1122, but are rather curved or curved twice, i.e., approximately S-shaped. As a result of this multiple or double curvature in opposite directions, the heating conductors 1020*a* and 1020*b* can be made longer between the connection points 1122 than if they were to run directly. An increase in length can be between 5% and 20% here. This makes it possible, on the one hand, to achieve a slightly higher resistance value due to the increased length for a given resistance value for a material of the heating conductors 1120 with a recommendable thickness and width of the conductor. Furthermore, the extension of the heating conductors 1120 can be better distributed over the total area covered by the heating conductor assembly 1114. It can be clearly seen here that the heating conductors 1120 are curved twice in opposite directions and always run in a curved manner or never run in a straight manner in any section. Admittedly, this could also be different, just about halfway along where the change in curvature takes place, a straight section could be provided. However, by avoiding such a straight section, the length of the heating conductors 1120 can be made somewhat longer. Furthermore, distribution over the entire area of the heating conductor assembly 1114 can be better for more uniform heating. The connection points 1122 are formed here so to speak by the heating conductors overlapping one another somewhat.

From the illustration of the heating conductor assembly 1114 according to FIG. 22 it can be seen that its longitudinal extension is from left to right, as in FIG. 21. The individual heating conductors 1120 could also be viewed as a type of continuous wavy curves or wavy lines, which are each arranged mirror-symmetrically to one another and are placed against one another in the direction transverse to the longitudinal extension from left to right. Essentially, however, this corresponds to a rounding of the lattice structure of FIG. 3, which provides exactly straight heating conductors there, which are always arranged in extensions to one another.

Figure 23:
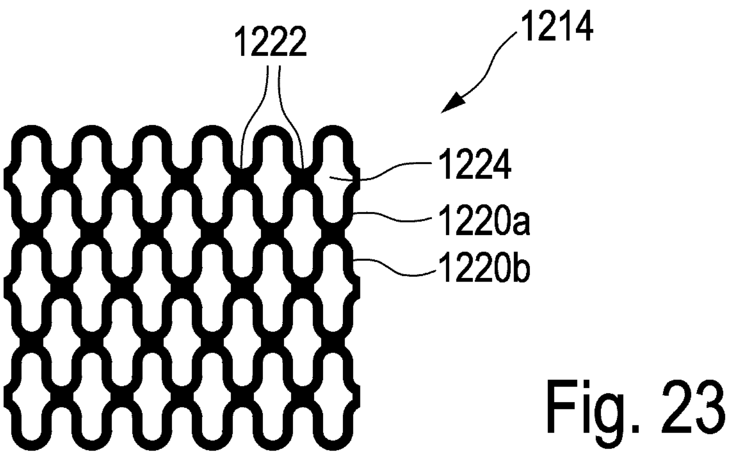
FIG. 23 shows a modification of the heating device similar to that of FIG. 3 with alternatively S-shaped bent individual heating conductors.

FIG. 23 shows yet another heating conductor assembly 1214 with heating conductors 1220*a* and 1220*b*, which in turn, similar to FIG. 22, are curved twice in opposite directions. It is also easy to imagine that the pattern of the heating conductor assembly 1214 of FIG. 23 is formed by upsetting the pattern of the heating conductor assembly 1114 of FIG. 22 in the left-to-right direction. In addition, the heating conductors 1220 are somewhat wider here in FIG. 23.

It can also be seen in FIG. 23 that the length of the heating conductors 1220*a* and 1220*b* between the connection points 1222 is 10% to 20% longer than in the case of heating conductors which are straight and arranged as an extension of one another according to FIG. 3. The resulting grid pattern is also regular, although it is different in the longitudinal direction of the heating conductor assembly 1214 from left to right than in a direction transverse thereto, namely compressed in the longitudinal direction, so to speak. In FIG. 22, the heating conductor assembly 1114 is, so to speak, compressed in the transverse direction. In the case of the heating conductor assembly in FIG. 3, this is the same in both directions mentioned.

Figure 24:
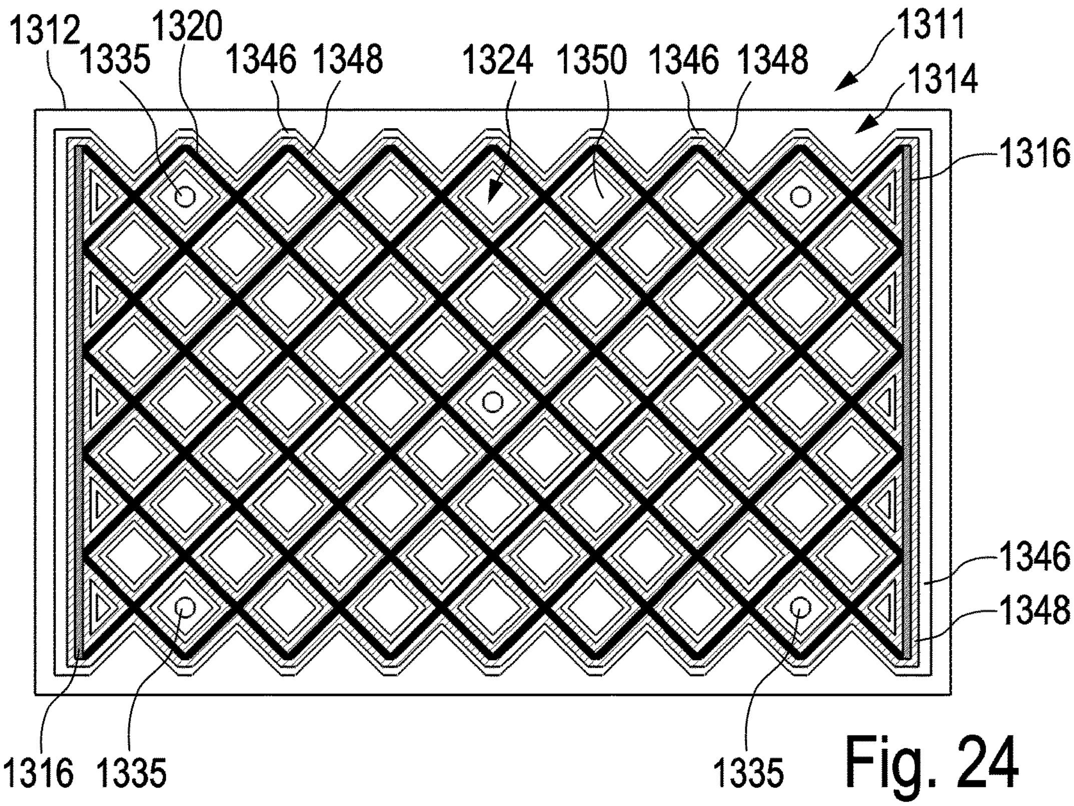
FIG. 24 shows a modification of the heating device of FIG. 22 with an insulating layer under the heating conductors and a cover layer above the heating conductors, both layers in the form of a lattice structure.

FIG. 24 shows a heating device 1311 which is a modification of the heating device from FIG. 3, for example. The heating device 1311 has an electrically conductive carrier 1312, for example consisting of a steel substrate. An insulating layer 1346 in a lattice structure is applied to an upper side of the carrier 1312, which is metallic and therefore electrically conductive, which is not suitable for a heating conductor assembly. It is advantageously formed by a dielectric glass film and is electrically insulating even at normal operating temperatures for such a heating device 1311, for example 200° C. to 500° C. It can be applied by a method mentioned at the outset, with which a heating conductor assembly is also applied, advantageously using the thick-film method with screen printing. The form of the lattice structure of the insulating layer 1346 has free spaces 1350 in meshes 1324, in which the normal surface of the carrier 1312, i.e., a steel surface, is thus exposed. It can thus be seen in FIG. 24 that the consumption of material for the insulating layer 1346 can be reduced by approximately 20% to 30% in comparison to covering the entire carrier 1312 with the insulating layer 1346 over the entire area, which would otherwise be necessary.

A heating conductor assembly 1314 with heating conductors 1320 runs on it in accordance with the lattice structure of the insulating layer 1346, specifically in the middle of it. These are applied to the insulating layer 1346 in a method mentioned at the outset, again advantageously in a thick-film method by means of screen printing, and baked in a known manner. The heating conductors 1320 also form the aforementioned meshes 1324. On the left and right, the heating conductors 1320 are contacted with elongate connection contacts 1316, which have also been applied to the insulating layer 1346 either before the heating conductors 1320 or afterwards, advantageously as a screen print in a thick-film method. Thus, here too, electrical contact is made to the heating conductor assembly 1314, similar to the aforementioned FIG. 1 or 3.

A cover layer 1348 is applied over the heating conductor assembly 1314 and the connection contacts 1316, which is electrically insulating on the one hand, for example, can have dielectric properties. On the other hand, it is resistant to environmental influences, in particular it protects the heating conductor 1320 and also the connection contacts 1316 against corrosion or permanent contact with oxygen. The cover layer 1348 can also, in particular like the insulating layer 1346, be glass-like or designed as a covering glass and can be applied in a thick-film method, in particular screen printing, and then backed in.

It can be clearly seen in FIG. 24 that the heating conductors 1320 run, so to speak, centrally in the webs or over the extensions of both the insulating layer 1346 with a lattice structure and the cover layer 1348 with a lattice structure. A width of the heating conductors 1320 can thus be approximately 1 mm, either constant or varying somewhat, as has been described above for FIG. 11. Even if the width of the heating conductors 1320 varies, they should run centrally, specifically between the insulating layer 1346 and the cover layer 1348, or these two should project beyond the heating conductors 1320 by the same distance on both sides. In this case, the insulating layer 1346 can protrude or overhang about 2 mm below the heating conductor 1320 on both sides. The cover layer 1348 should protrude by about 1 mm over the heating conductors 1320 or overlap onto the insulating layer 1346 on both sides. A sufficiently good insulation against leakage currents and, above all, a high level of protection for the heating conductor 1320 against environmental influences can thus be achieved here.

According to FIG. 1, the connection contacts 1316 should be guided to contact pads, which are not shown here. To do this, the contact pads must also run on an insulating layer and are not covered by a cover layer.

Bores 1335 through the carrier 1312 can be provided in the meshes 1324 or free spaces 1350 in accordance with FIG. 13. Alternatively, bolts, pins or the like, in particular for electrical contacts, can be attached or welded on.

While it was explained above how much material can be saved for the insulating layer 1346, it can be seen that the even narrower strips of the cover layer 1348 over the heating conductors 1320 can also significantly reduce the material consumption for this cover layer 1348. About 40% to 50% can be saved compared to a full-area design.

The strips of the insulating layer 1346 are therefore about 5 mm wide, they should be a maximum of 10 mm wide. The strips of the cover layer 1348 are approximately 3 mm wide and the heating conductors 1320 themselves are approximately 1 mm wide. The free spaces 1350 within the meshes are approximately 6 mm×6 mm.

Figure 25:
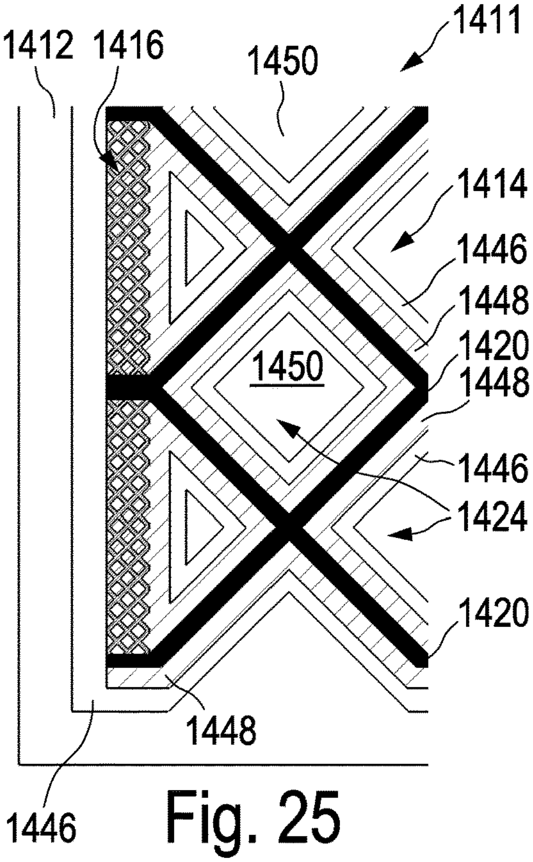
FIGS. 25 and 26 show a highly enlarged view of a heating device according to that of FIG. 24 with connection contacts that also have a lattice structure.
Figure 26:
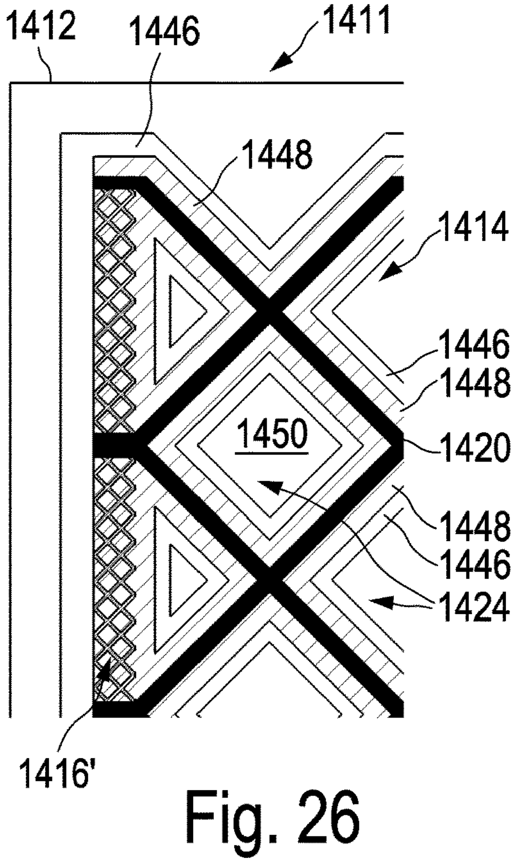

FIGS. 25 and 26 show yet another heating device 1411 with a carrier 1412 as a steel substrate. Heating conductors 1420 of a lattice-shaped heating conductor assembly 1414 similar to FIG. 24 run centrally on an insulating layer 1446 in a lattice structure according to FIG. 24. The geometric dimensions, materials and application methods also correspond to those of FIG. 24. Instead of the strip-shaped connection contacts in FIG. 24, here there are connection contacts 1416 in the form of a lattice or as a lattice structure, as mentioned at the outset. The lattice-shaped connection contacts 1416 are applied to the heating conductors 1420, advantageously printed, specifically on connection sections 1420' pointing to the left. In this way, it can be achieved that not only the insulating layer 1446 and a cover layer 1448 can be implemented over the heating conductor 1420 in a lattice structure and thus in a material-saving manner, but also the connection contacts 1416. In general, this can be an advantage in the case of heating conductors 1420 with a lower current density in the contact area, in which case a minimum conductor track width is restricted or limited by inaccuracies during production, for example by screen printing. The material consumption for the connection contacts 1416 can be adapted to the conductor cross-section that is actually required, as can the current densities that actually occur. In addition, when a current density decreases by varying the mesh size of the lattice structure of the connection contacts 1416, the conductor track width and possibly also the film thickness of the connection contacts 1416, its conductor cross-section can be adapted to such a reduced current density. For such thin individual conductors of the lattice-shaped connection contacts 1416, whose width can be 0.1 mm to 0.3 mm, for example, a thick-film paste with a very high silver content or a resistance material with a correspondingly high silver content can be used, the electrical resistance of which is very low. However, since the consumption is extremely low, overall cost advantages can be achieved.

It can be seen that a cover layer 1448 is applied over the heating conductors 1420 and over the connection contacts 1416, as has been described above for FIG. 24. It covers the connection contacts 1416 except for contact pads that are not shown, and thus protects them from external influences, in particular corrosion. Here, too, the heating conductors 1420 run, so to speak, in the middle or centered within the lattice structure of the insulating layer 1446 and the cover layer 1448.

In FIG. 26, so to speak, based on FIG. 24, a left upper corner area of the heating device 1411 is shown, while in FIG. 25*a* left lower corner area is shown, so to speak. The lattice structures of the two connection contacts 1416 and 1416' in FIG. 26 are different. While the individual conductor widths of the connection contacts are the same, in FIG. 25 four individual conductors are extended along the length of the connection contact 1416 in a zigzag fashion, so to speak. In FIG. 26, so to speak, three conductors are extended in a zigzag shape corresponding to the longitudinal extension of the connection contact 1416'. In this way, for example, an embodiment corresponding to FIG. 11 can be achieved with different widths of the heating conductors 1420 and the respective current densities. The meshes 1424 or the free spaces 1450 are not only quadrangular or rectangular here, but square.

Figure 27:
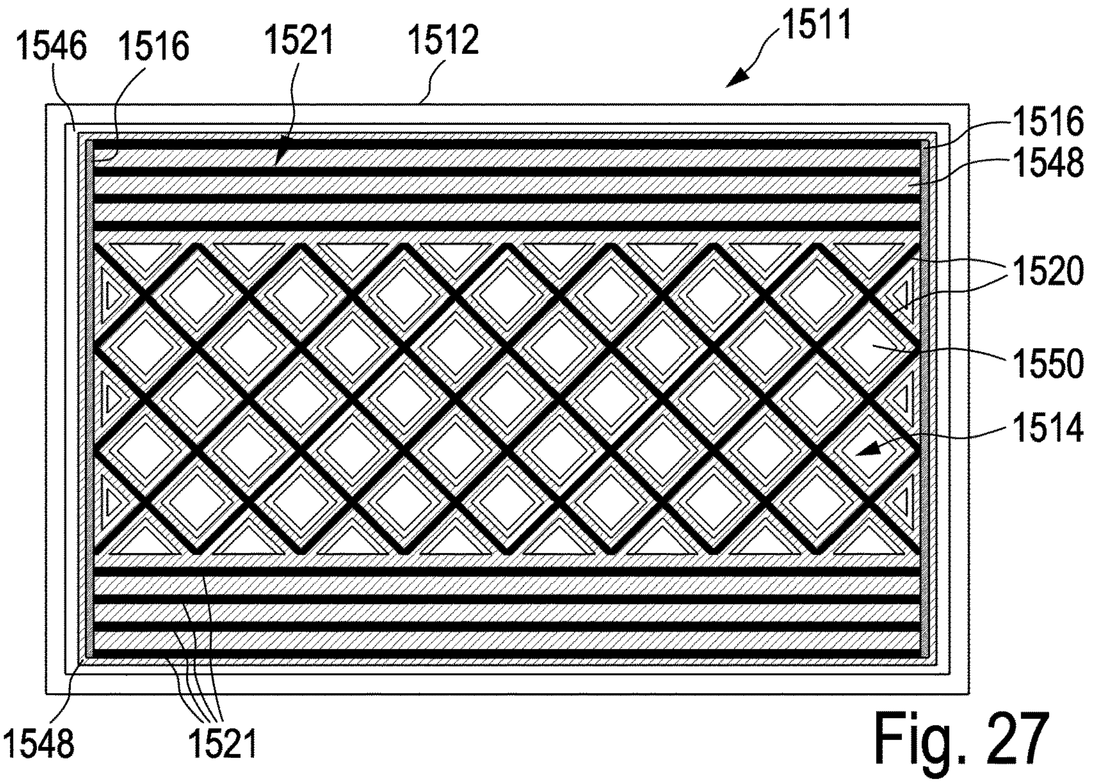
FIG. 27 shows a modification of the heating device of FIG. 9 with a parallel connection of narrow strip-shaped heating conductors and a lattice-shaped heating conductor assembly in between, FIG. 28 shows a modification of the heating device of FIG. 14 with a C-shaped free-cut which runs in a zigzag shape in the vertical region.

FIG. 27 shows a heating device 1511 as a modification of the heating device 711 of FIG. 9, which has a carrier 1512 with an insulating layer 1546 on the surface of the carrier 1512 according to FIG. 24, on which a heating conductor assembly 1514 is then applied. An elongate connection contact 1516 is provided on the left and right between two connection contacts 1516. Four parallel, narrow heating conductors 1521 run at the top between the two connection contacts 1516, and four parallel, narrow heating conductors 1521 also run at the bottom in the same way. Between these two assemblies of parallel heating conductors 1521, a lattice-shaped configuration of heating conductors 1520 according to FIG. 24 extends as a heating conductor assembly 1514. All heating conductors 1520 and 1521 and the connection contacts 1516 are covered with a cover layer 1548, as explained above, with free spaces 1550 being provided in the region of the heating conductors 1520. The heating device 1511 in FIG. 27 is therefore a parallel circuit, which may possibly allow a more homogeneous temperature distribution in the heating device 1511.

Figure 28:
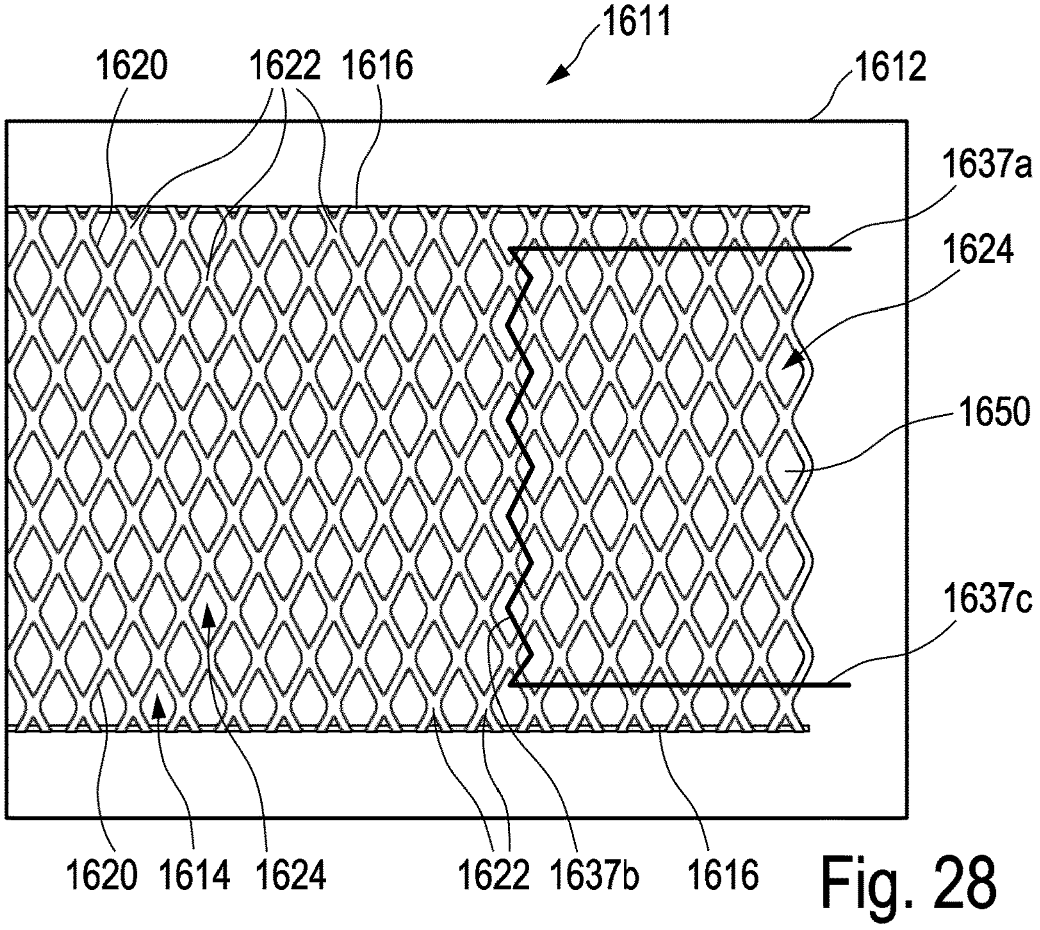

FIG. 28 shows, as a modification of the heating device 11 of FIG. 14, a heating device 1611 with a carrier 1612, on the upper side of which an insulating layer (not shown) and thereon two parallel, horizontally extending connection contacts 1616 and a heating conductor assembly 1614 extend. The individual heating conductors 1620 of the heating conductor assembly 1614 do not form a square mesh as in FIG. 14, but rather a diamond-shaped mesh 1624. They are also similar to those of FIG. 23. It is important here that the heating conductors 1620 of the individual meshes 1624 are severed approximately in the middle of the heating conductors 1620 between the connection points 1622 by means of free cuts 1637, at least along a vertical extension of the free cut section 1637*b*. The horizontal free cut sections 1637*a* and 1637*c* are implemented in a straight line. Otherwise, malfunctions in the operation of the heating conductor assembly 1614 can occur. The angle at which the individual heating conductors 1620 are severed along the vertical free cut section 1637*b* should be as close as possible to a right angle, advantageously at least 45° or at least 55°. This angle is about 60° here. This results in the zigzag path of the free cut section 1637*b* shown here.

Figure 29:
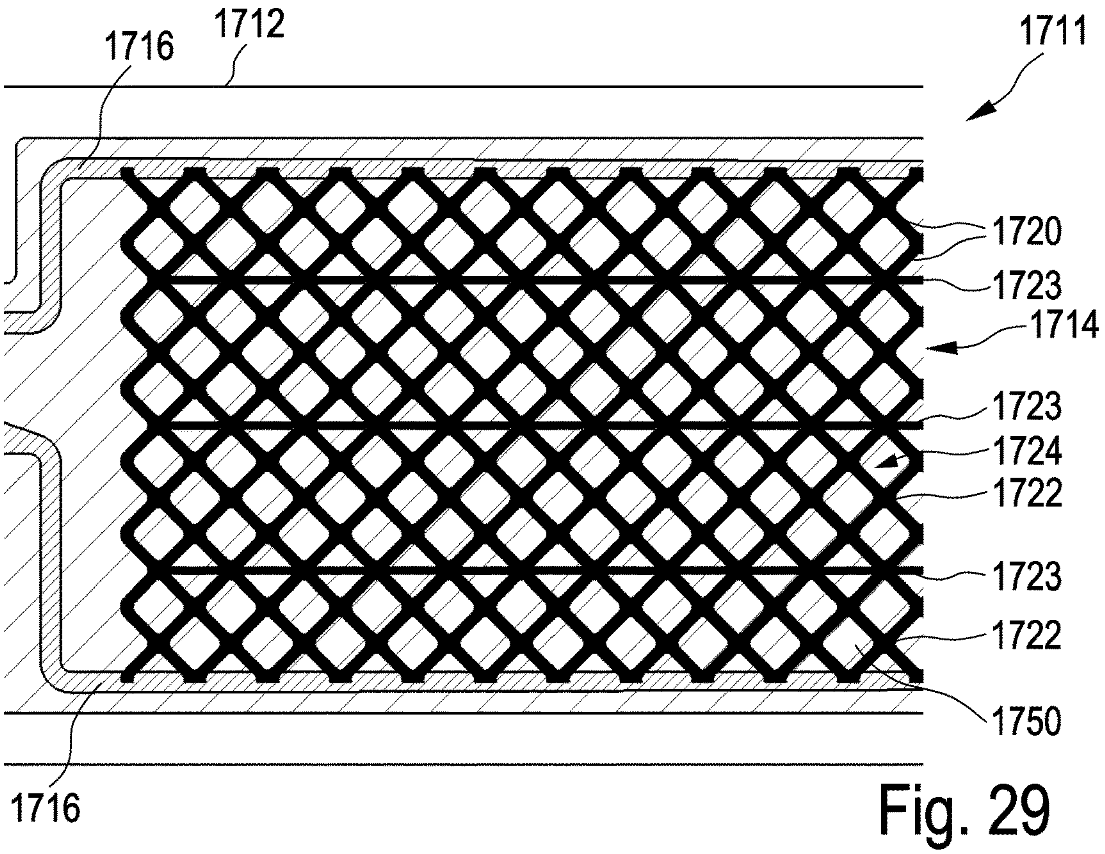
FIG. 29 shows a modification of the heating device of FIG. 1, in which additional heating conductor tracks run parallel to the connection contacts.

In the case of the heating device 1711 of FIG. 29, two parallel connection contacts 1716 are arranged on a carrier 1712 with an insulating layer 1746 thereon. A lattice-like heating conductor assembly 1714 with individual heating conductors 1720, which form square meshes 1724, extends between these. As a special feature, three heating conductor tracks 1723 running transversely are provided here, which consist of the same material as the heating conductors 1720 and are advantageously also applied in the same step. They run through connection points 1722 of the heating conductors 1720 and the meshes 1724. They increase safety when operating the heating device 1711 when hot spots result in hot places and thus local overheating, for example due to calcification on one side of the medium, which leads to one of the heating conductors 1720 burning through or being destroyed. Around this burned through and destroyed heating conductor 1720, so to speak as an essentially small or punctiform area, there are then increased current concentrations of a current flow between the two connection contacts, starting from the local overheating. These current concentrations then lead to further heating conductors burning through. This burning through or destruction can then continue along one of the linear heating conductor tracks 1723 to one side or to both sides, specifically approximately parallel to the connection contacts 1716, until the entire heating conductor assembly 1714 in between is severed. Then there is no current flow at all through the heating conductor assembly 1714, which is irreversibly destroyed.

Due to the course of the heating conductor tracks 1723 transverse to the main direction of current flow between the connection contacts 1716, the heating conductor tracks 1723 have no effect at all when the heating conductor assembly 1714 is operating properly, and are therefore also not disruptive.

Figure 30:
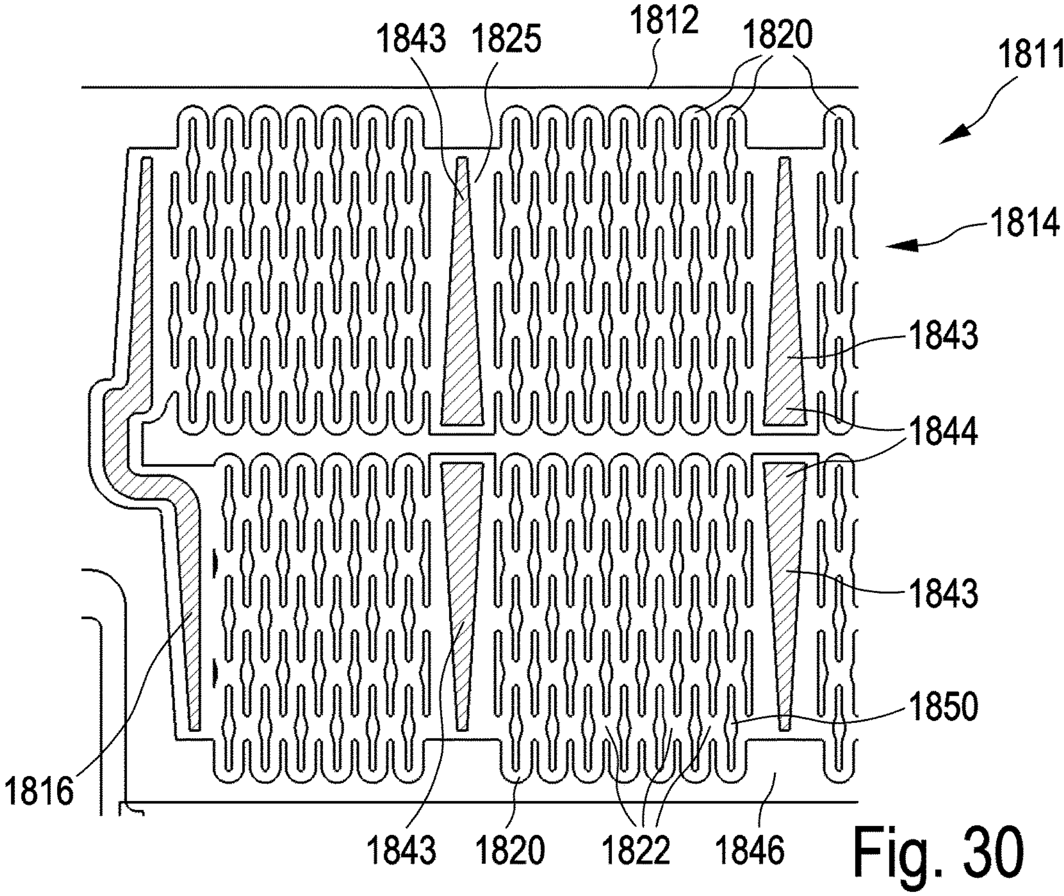
FIG. 30 shows a modification of the heating device of FIG. 19 with differently configured large-area contacts.

Yet another heating device 1811 is shown in FIG. 30. There, on the one hand, the heating conductors 1820 of the heating conductor assembly 1814 are designed as meshes with a shape corresponding to FIG. 23, but even narrower or more compressed in the horizontal direction. In a modification of the large-area contacts 543 of the heating device 511 of FIG. 18 or the large-area contacts 543' of the heating device 511' of FIG. 19, large-area contacts 1843 are designed here in such a way that a wide or rectangular field 1825 of heating conductor material is provided between two sections of heating conductors 1820. A large-area contact 1843 made of much more conductive contact material, similar to the aforementioned connection contacts, is applied on top of or below it. These large-area contacts 1843 are designed in a narrow wedge shape and start at a point at one end up to a widening 1844. A better adjustment of the heating device 1811 is partly possible as a result.

FIG. 30 also shows that, in addition to the large-area contacts 1843, a connection contact 1816 of two parallel strip-shaped heating conductor assemblies 1814, as can be seen for example in FIG. 18, is similarly designed with a central widening that becomes narrower towards the two ends. In this way, contact material can be saved, since less current flow is to be expected at the ends of the connection contact 1816 than in the middle area, where it is wider.

The invention claimed is:

1. A heating device having:

a large-area expanded carrier, two connection contacts, at least one heating conductor assembly on said carrier, said heating conductor assembly being connected to said connection contacts for electrical connection, wherein said heating conductor assembly has a plurality of heating conductors, said heating conductors are connected to each other at connection points, said heating conductors are electrically connected as a whole so as to form parallel and series circuits between said connection contacts, each set of said at least three heating conductors forms a closed mesh and at least three said heating conductors are connected to each other at said connection points, said heating conductor assembly is applied onto said carrier with a film construction in a film method, wherein it has at least one additional heating conductor assembly which has two additional connection contacts and a single large-area additional heating conductor arranged therebetween, and wherein said additional heating conductor is elongated between said two additional connection contacts.

2. The heating device according to claim 1, wherein at least 80% of said connection points have an equal number of said heating conductors connected to them.

3. The heating device according to claim 1, wherein exactly three said heating conductors or exactly four said heating conductors meet at said connection points.

4. The heating device according to claim 1, wherein at least 80% of said heating conductors are curved twice in opposite directions, wherein a length of one said heating conductor curved twice between said connection points at its ends is at least 10% longer than a straight line between said connection points.

5. The heating device according to claim 1, wherein at least 80% of said heating conductors have the same length, wherein at least 80% of said heating conductors also have the same shape.

6. The heating device according to claim 1, wherein an angular region between two said adjacent heating conductors at one said connection point is not angular but rather rounded with a radius of 5% to 100% of a maximum width of said heating conductor.

7. The heating device according to claim 1, wherein said heating conductors are provided with different widths, with a maximum variation in said width of 40%.

8. The heating device according to claim 7, wherein said width is varied in such a way that one said heating conductor has a constant width over an extension between said two connection points at its ends.

9. The heating device according to claim 7, wherein said width is varied in such a way that one said heating conductor has a varying width over an extension between said two connection points at its ends, wherein said width of said heating conductor increases monotonically from one said connection point to another said connection point.

10. The heating device according to claim 1, wherein a plurality of said connection points in one region of said heating conductor assembly have only two said heating conductors, wherein said heating conductors correspond to said other remaining heating conductors, wherein said connection points are located in an edge region of said heating conductor assembly or adjacent to a free surface area within said heating conductor assembly.

11. The heating device according to claim 10, wherein a recess in an edge region of said heating conductor assembly is provided in an edge region in a manner of an indentation, wherein two or three said heating conductors are connected to each other in said region of said indentation at said adjacent or external connection points.

12. The heating device according to claim 1, wherein a free surface area within said heating conductor assembly is free of said heating conductors and said connection points, wherein said free surface area is bordered by said heating conductors extending or running in a straight manner in relation to one another, wherein two or three said heating conductors are connected to each other at a plurality of said connection points adjacent to said free surface area, wherein said free surface area corresponds to between ten times and fifty times a surface area of a mesh.

13. The heating device according to claim 1, wherein secondary connection contacts are connected to each of said connection contacts, said secondary connection contacts being arranged in pairs opposite one another in a direction perpendicular to a longitudinal extension of said connection contacts, wherein said secondary connection contacts, which are each connected to one said connection contact, are separated from one another and are each electrically connected to said connection contact by means of bridge contacts.

14. The heating device according to claim 1, wherein large-area contacts are applied to one said heating conductor assembly, which are designed in strips and which cover at least part of a width of one said heating conductor assembly in a direction transverse to its longitudinal extension and make electrical contact, wherein said large-area contacts can be partially covered in a highly electrically conductive material, which overlaps and contacts one said adjacent connection contact or one said secondary connection contact or one said adjacent heating conductor assembly, wherein a width of one said large-area contact increases by at least 50% in width in a direction towards said adjacent connection contact, said secondary connection contact or said adjacent heating conductor assembly.

15. The heating device according to claim 1, wherein a length of said additional heating conductor is at least ten times greater than its width.

16. The heating device according to claim 1, wherein a width of said additional heating conductor is less than 50% of a width of said heating conductor.

17. The heating device according to claim 1, wherein a length of said additional heating conductor is between 90% and 150% of a length of said heating conductor.

18. The heating device according to claim 1, wherein a mesh is designed approximately hexagonal or designed in a form of a honeycomb, wherein four longitudinal sides of said hexagon are each formed by a single heating conductor and two longitudinal sides of said hexagon are each formed by one elongate connection point, wherein said heating conductors are longer than said elongate connection points.

19. The heating device according to claim 1, wherein between said heating conductor and said carrier there is an insulating layer or a dielectric layer which is at least as wide as said heating conductor and is at most 10 mm wider than said heating conductor on both sides of said heating conductor and protrudes at most 10 mm under said heating conductor on both sides, wherein an extension of said insulating layer or said dielectric layer corresponds to an extension of said heating conductor, wherein said insulating layer or said dielectric layer has free spaces within said meshes without insulating layer or without dielectric layer.

20. The heating device according to claim 1, wherein a cover layer is provided over or on said heating conductor, which is at least as wide as said heating conductor and at most 10 mm wider than said heating conductor on both sides of said heating conductor and protrudes at most 10 mm beyond said heating conductor on both sides, wherein an extension of said cover layer corresponds to an extension of said heating conductor, wherein said cover layer has free spaces within said meshes without one said cover layer.

21. The heating device according to claim 1, wherein all connection contacts which are connected to said heating conductor assembly or heating conductors are designed as a lattice structure, wherein said lattice structure of said at least one connection contact has meshes with free spaces therein.

22. The heating device according to claim 1, wherein said heating conductor assembly or its heating conductors are severed along free cut sections, wherein said free cut sections begin at an outer edge region of said heating conductor assembly and separate a closed surface of said heating conductor assembly, thereby severing said individual heating conductors in such a way that a closed surface is electrically separated and electrically isolated from a rest of said heating conductor assembly.

23. The heating device according to claim 1, wherein linear tracks of heating conductor material are provided transversely to a general direction of current flow through a lattice-shaped heating conductor assembly between two said connection contacts, wherein said linear tracks of heating conductor material run through connection points of said heating conductors or said meshes.

* * * * *